(12) United States Patent
Schleif et al.

(10) Patent No.: US 10,976,220 B2
(45) Date of Patent: Apr. 13, 2021

(54) WIRELESS ANTENNA SYSTEM FOR SENSORS ON CIRCUMFERENTIAL INTERIOR SURFACE OF TURBOMACHINE CASING

(71) Applicant: General Electric Company, Schenectady, NY (US)

(72) Inventors: Kurt Kramer Schleif, Greenville, SC (US); Mario Joseph Arceneaux, Greenville, SC (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 16/437,948

(22) Filed: Jun. 11, 2019

(65) Prior Publication Data

US 2020/0393328 A1    Dec. 17, 2020

(51) Int. Cl.
| | | |
|---|---|---|
| *G01M 15/14* | (2006.01) | |
| *G01M 15/02* | (2006.01) | |
| *H02J 50/00* | (2016.01) | |

(52) U.S. Cl.
CPC ............ *G01M 15/02* (2013.01); *G01M 15/14* (2013.01); *H02J 50/00* (2016.02)

(58) Field of Classification Search
CPC .............................. G01M 15/02; G01M 15/04
USPC ...................................................... 73/112.01
See application file for complete search history.

(56) References Cited

U.S. PATENT DOCUMENTS

| | | | |
|---|---|---|---|
| 4,395,827 A | 8/1983 | Stowe et al. | |
| 4,830,449 A | 5/1989 | Spillman, Jr. | |
| 5,005,353 A | 4/1991 | Acton et al. | |
| 8,444,377 B2 | 5/2013 | Kottilingam et al. | |
| 9,261,384 B2 | 2/2016 | Schleif et al. | |
| 9,494,490 B2* | 11/2016 | Tralshawala | .......... F01D 21/003 |
| 10,030,811 B2 | 7/2018 | Schleif et al. | |
| 10,180,079 B2 | 1/2019 | Schleif et al. | |
| 2006/0056960 A1 | 3/2006 | Sabol et al. | |
| 2007/0041834 A1* | 2/2007 | Schram | ................... F03D 80/30 |
| | | | 416/61 |
| 2010/0074727 A1 | 3/2010 | Twerdochlib | |
| 2010/0219942 A1* | 9/2010 | Lee | ......................... F01D 17/02 |
| | | | 340/10.51 |
| 2010/0290906 A1 | 11/2010 | Moeckel et al. | |
| 2010/0296911 A1 | 11/2010 | McCallum | |

(Continued)

OTHER PUBLICATIONS

U.S. Appl. No. 16/437,934, Office Action dated Jan. 23, 2020, 23 pgs.

(Continued)

*Primary Examiner* — Eric S. McCall
(74) *Attorney, Agent, or Firm* — Charlotte Wilson; Hoffman Warnick LLC

(57) ABSTRACT

A wireless sensor antenna system for a turbomachine including a rotating blade including a passive sensor is disclosed. The wireless sensor antenna system includes an antenna extending continuously along a circumferential interior surface of a casing of the turbomachine that surrounds the rotating blade. The antenna is configured to receive a return wireless signal from the passive sensor. A power transmission element extends along the at least portion of the circumferential interior surface of the casing to power the passive sensor by emitting an electromagnetic signal to power the passive sensor.

12 Claims, 29 Drawing Sheets

(56) References Cited

U.S. PATENT DOCUMENTS

| | | |
|---|---|---|
| 2012/0182563 A1 | 7/2012 | Kominsky |
| 2012/0325790 A1 | 12/2012 | Chida et al. |
| 2014/0069460 A1 | 3/2014 | Kell et al. |
| 2014/0376590 A1 | 12/2014 | Hwang et al. |
| 2015/0011322 A1 | 1/2015 | Schleif et al. |
| 2015/0322813 A1* | 11/2015 | Tralshawala ............ F01D 11/20 415/118 |
| 2016/0084637 A1 | 3/2016 | John |
| 2016/0123528 A1 | 5/2016 | Schleif et al. |
| 2016/0210845 A1* | 7/2016 | Shaw .................... F01D 17/085 |
| 2018/0202312 A1 | 7/2018 | Schleif et al. |
| 2019/0072511 A1 | 3/2019 | Warren et al. |
| 2019/0078869 A1 | 3/2019 | Warren et al. |
| 2019/0181689 A1* | 6/2019 | Oyama ................... H02J 50/20 |
| 2020/0124030 A1* | 4/2020 | Egedal ................. F03D 7/0204 |
| 2020/0166432 A1* | 5/2020 | Schleif ..................... F01D 5/14 |
| 2020/0173884 A1* | 6/2020 | Dardona ............... G01M 15/14 |
| 2020/0274236 A1 | 8/2020 | Costello et al. |

OTHER PUBLICATIONS

U.S. Appl. No. 16/437,934, Notice of Allowance dated May 11, 2020, 18 pages.
U.S. Appl. No. 16/437,943, Office Action dated Nov. 17, 2020, 23 pages.
U.S. Appl. No. 16/437,952, Office Action dated Dec. 28, 2020, 14 pages.

\* cited by examiner

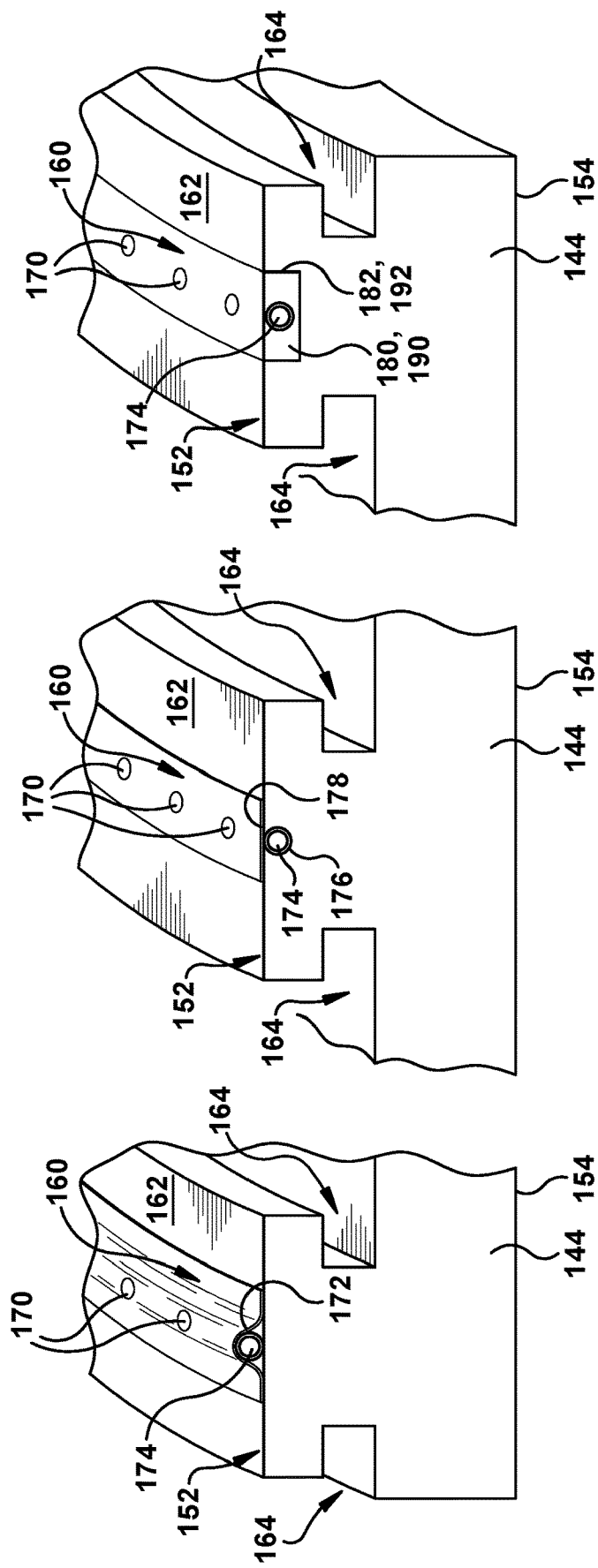

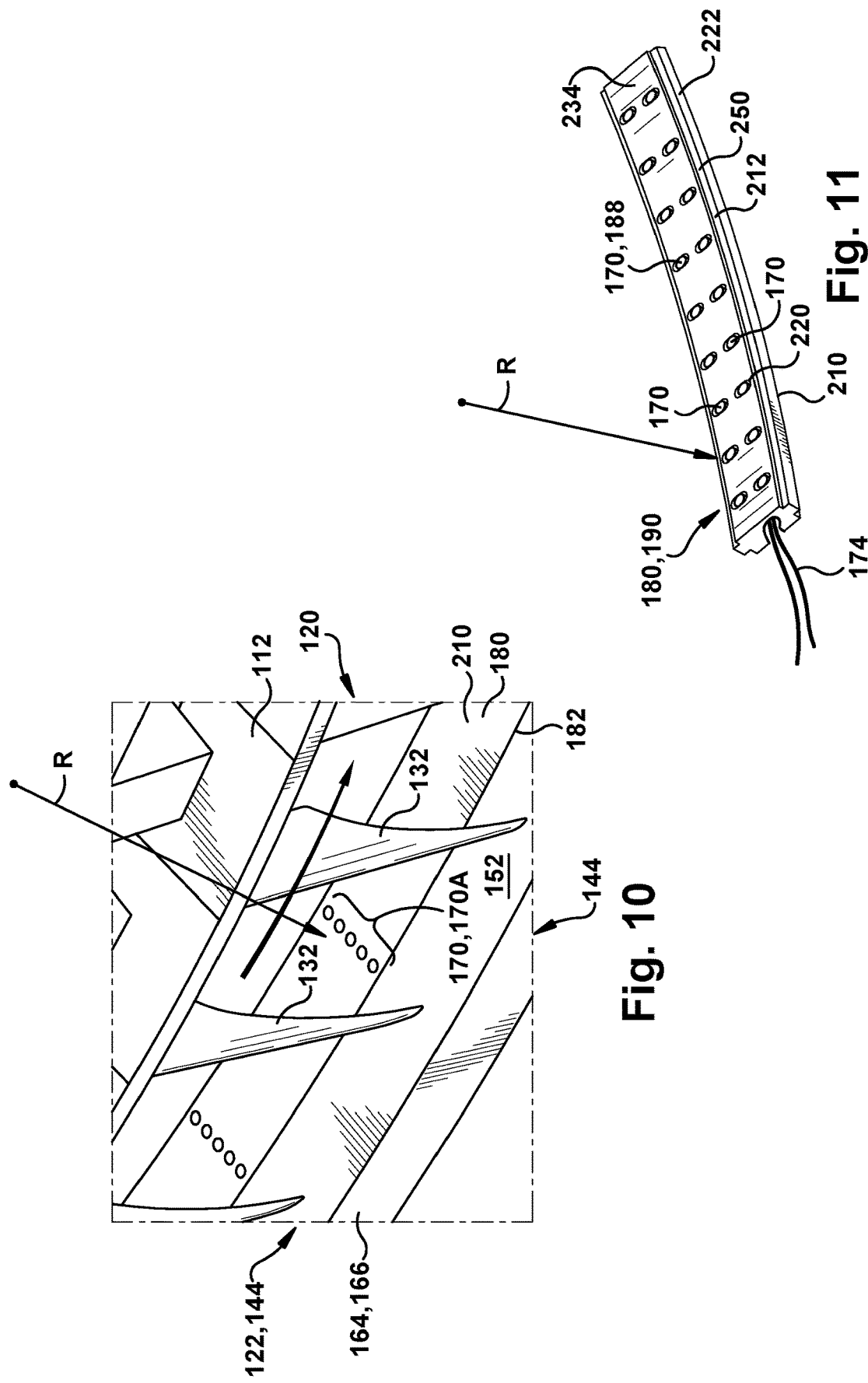

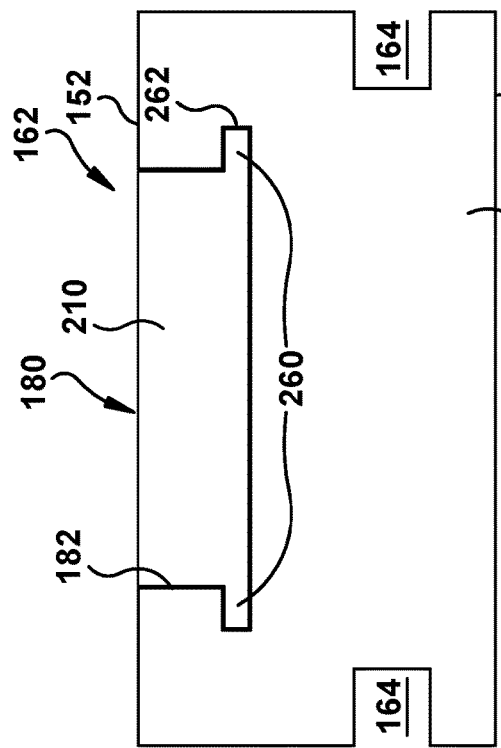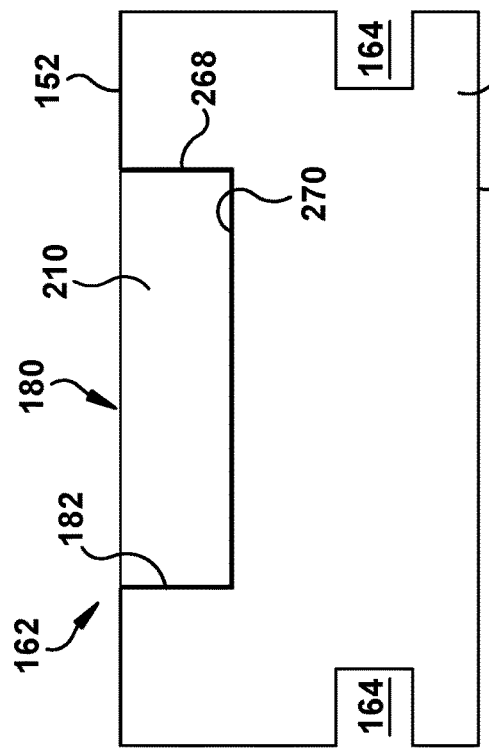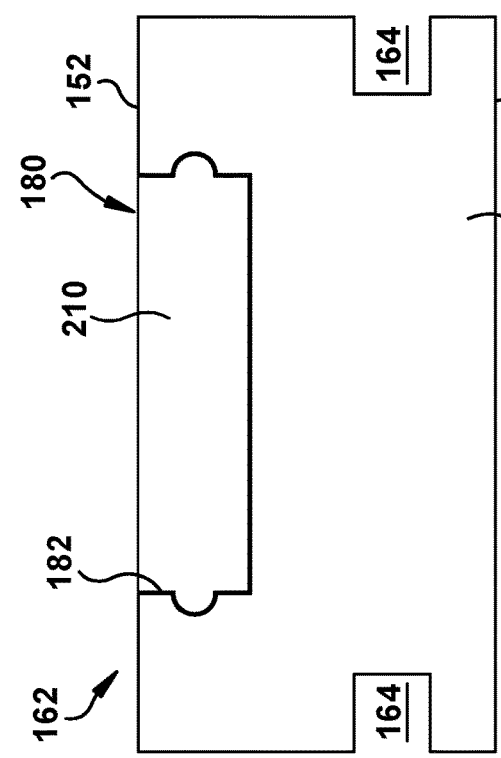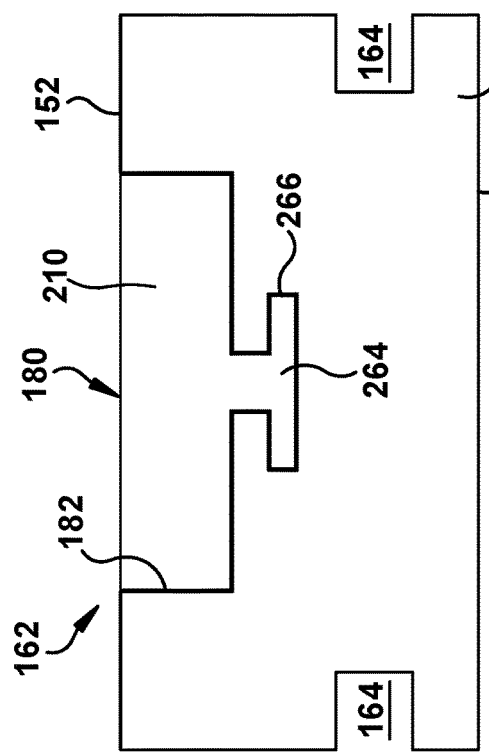

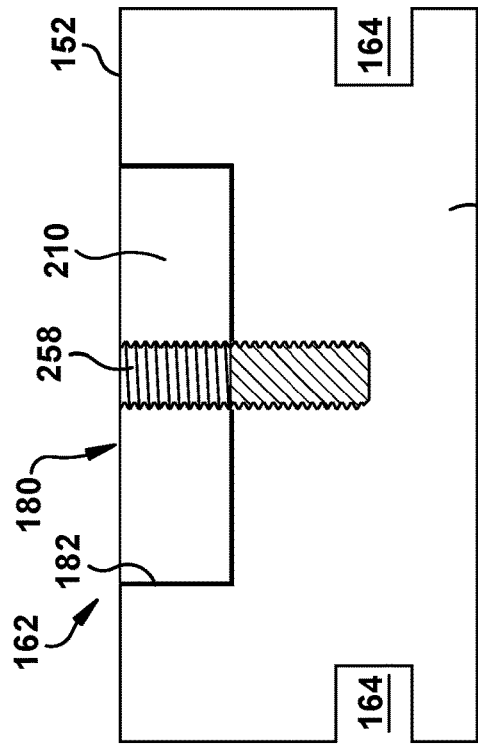
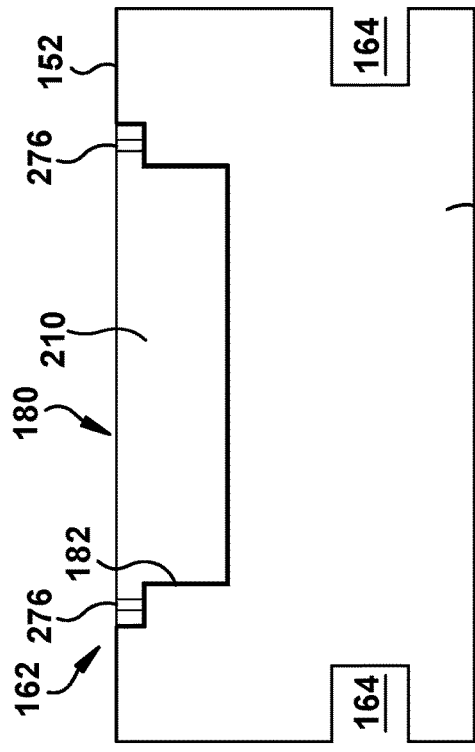
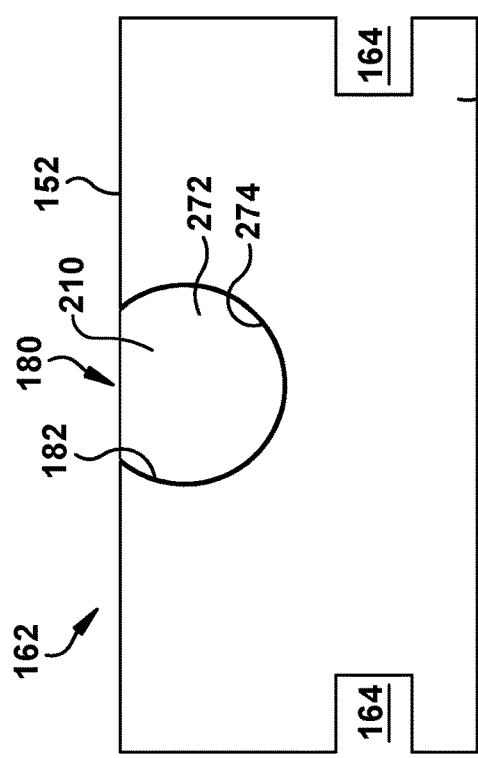
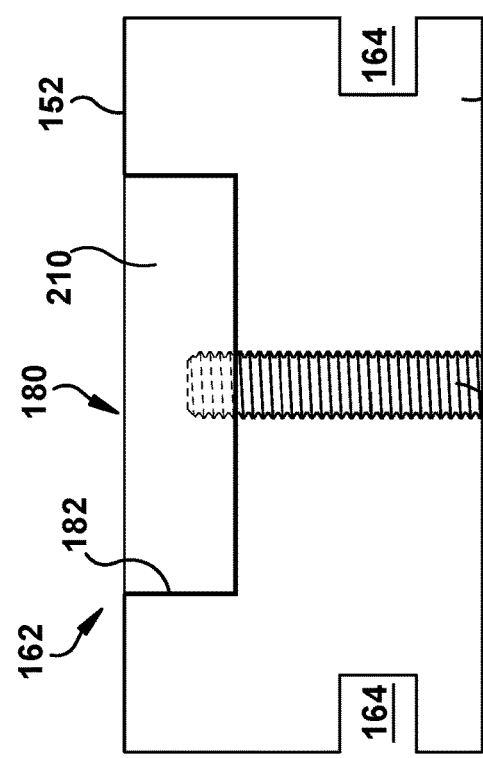

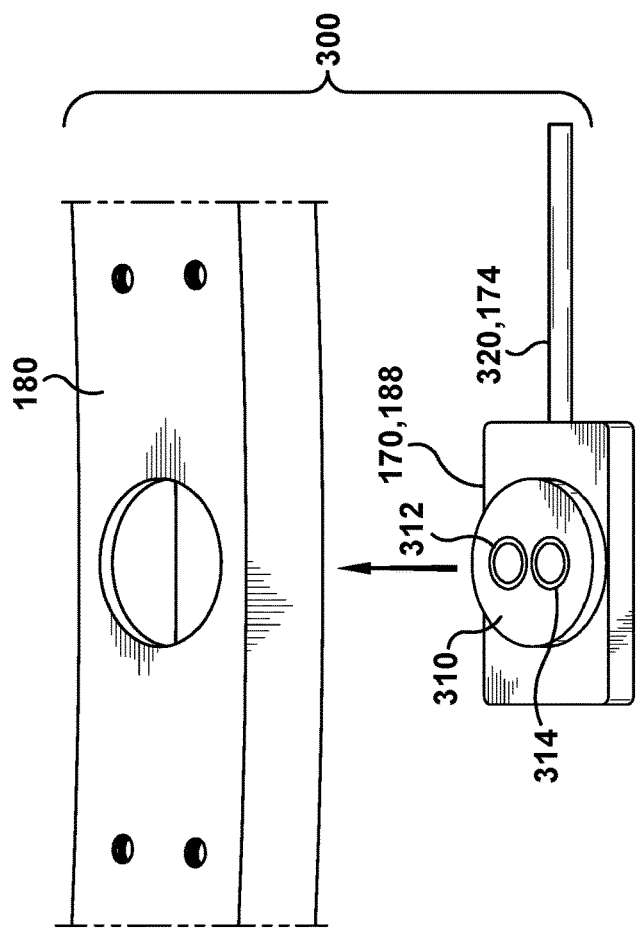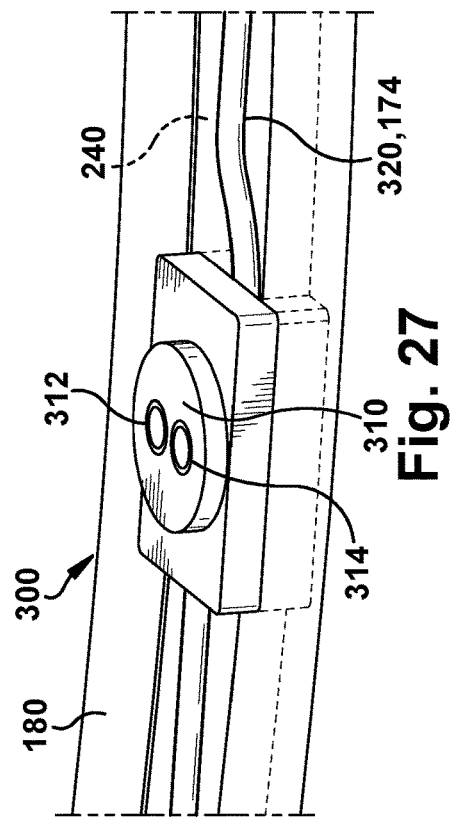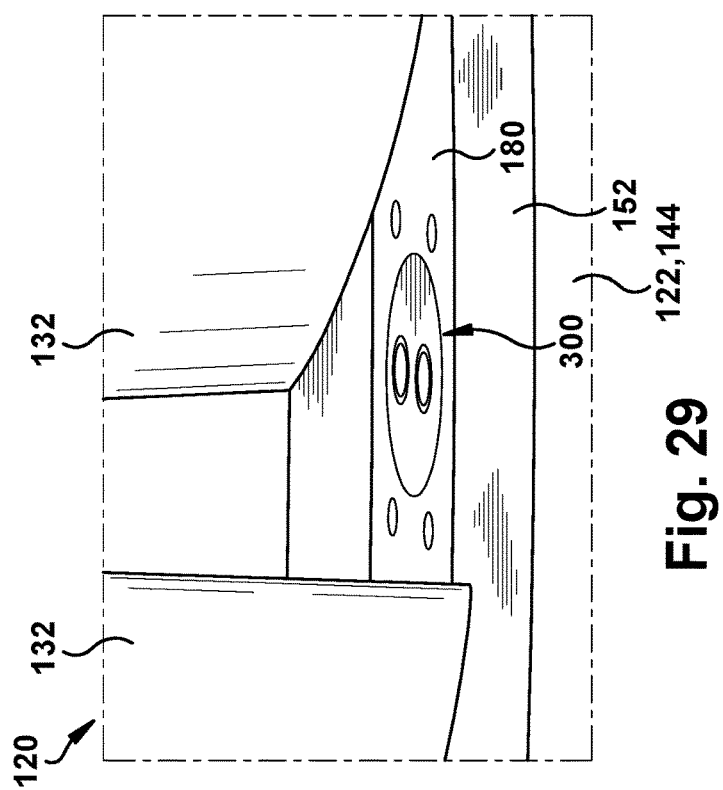

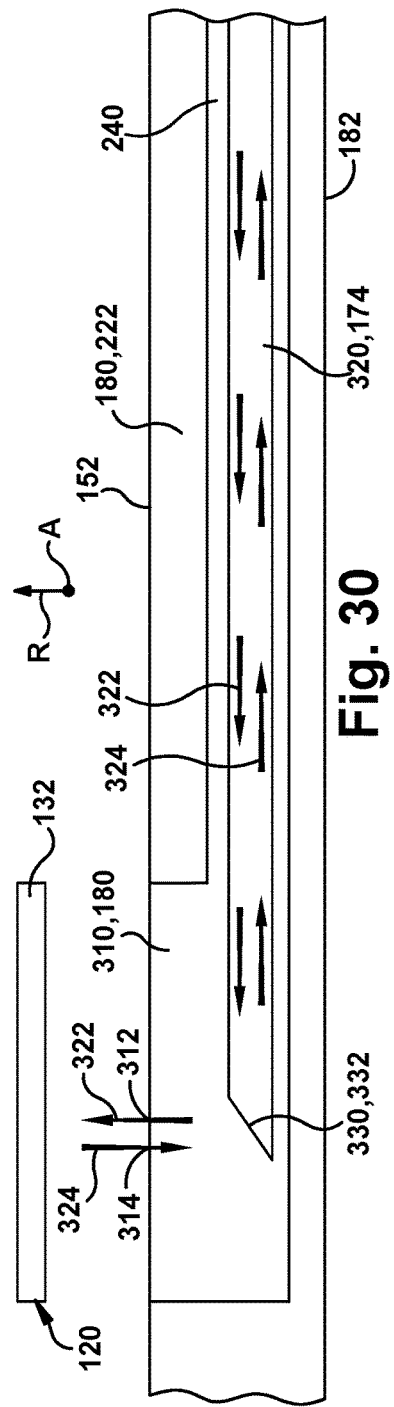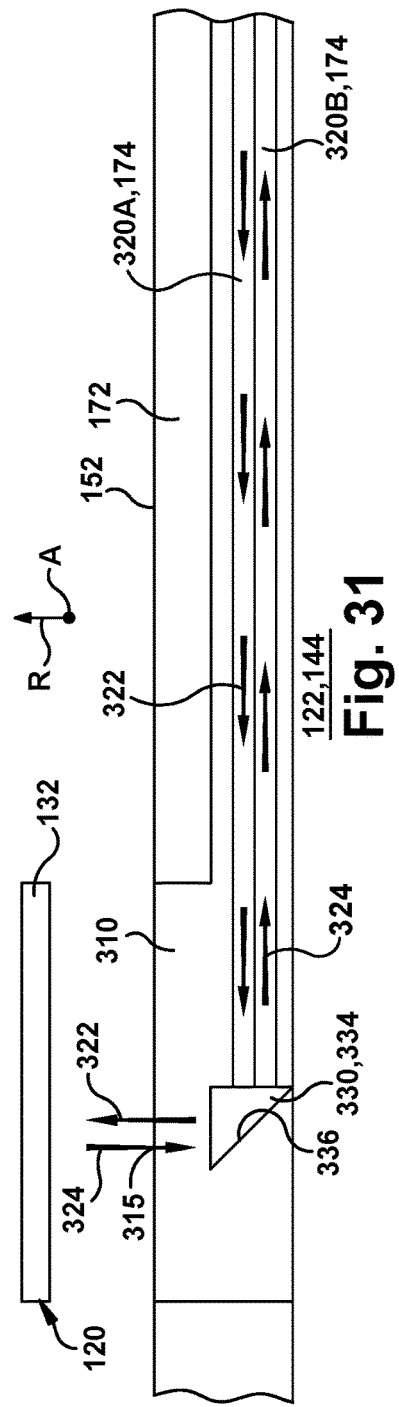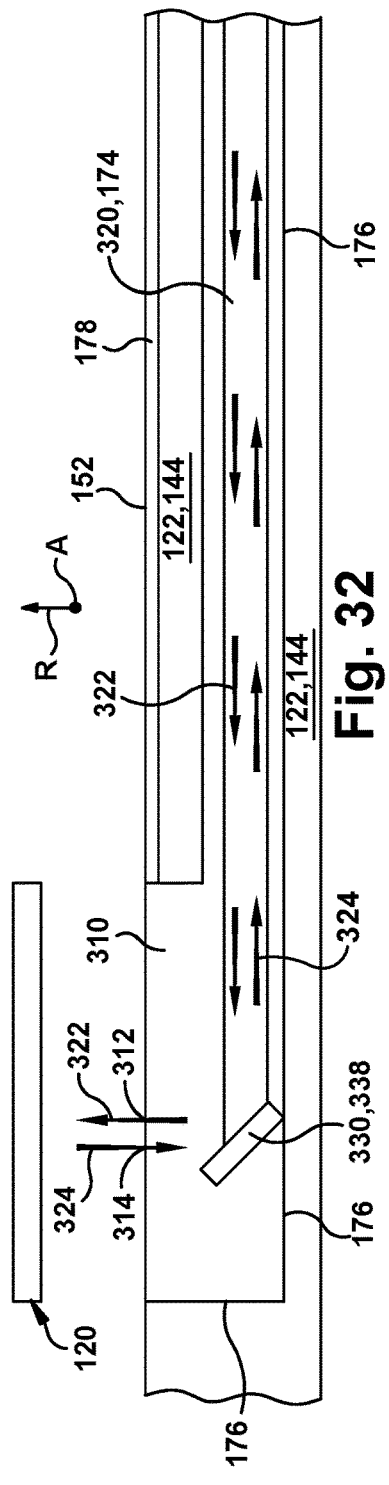

WIRELESS ANTENNA SYSTEM FOR SENSORS ON CIRCUMFERENTIAL INTERIOR SURFACE OF TURBOMACHINE CASING

This application is related to the following US Application Numbers:

Ser. No. 16/437,952 filed concurrently herewith, entitled SYSTEMS AND METHODS FOR SENSORS ON CIRCUMFERENTIAL INTERIOR SURFACE OF TURBOMACHINE CASING, GE;

Ser. No. 16/437,943 filed concurrently herewith, entitled SENSOR MOUNTING FOR CIRCUMFERENTIAL INTERIOR SURFACE OF TURBOMACHINE CASING, GE;

Ser. No. 16/437,958 filed concurrently herewith, entitled MOUNTING SYSTEM FOR TOOL FOR MACHINING CIRCUMFERENTIAL INTERIOR SURFACE OF TURBOMACHINE CASING, GE; and Ser. No. 16/437,934 filed concurrently herewith, entitled OPTICAL SENSOR FOR CIRCUMFERENTIAL INTERIOR SURFACE OF TURBOMACHINE CASING, AND RELATED METHOD, GE.

BACKGROUND OF THE INVENTION

The disclosure relates generally to turbomachine measurements, and more particularly, to sensor systems positioned relative to a circumferential interior surface of a turbomachine casing.

Turbomachines are widely used to generate power. Most turbomachines such as gas turbines, jet engines, steam turbines, etc., are equipped with sensors for the purpose of, for example, monitoring the health of the machine, validating new parts, and/or performing diagnostics. Sensors may be discrete, independent measurement points or they may be discrete measurement points as part of a larger system. The sensors may measure parameters such as temperature, pressure, distance, speed, physical presence of a part, etc. In one particular example, the magnitude and frequency of vibration of a rotating blade may be measured using an array of strategically positioned, stationary, non-contact sensors. This technique is referred to as a "blade tip timing" measurement.

One sensor integration approach requires machining of holes that penetrate radially from the outer diameter of the casing to the inner diameter of the casing. The sensors are mounted in the radial holes. This approach presents a number of challenges. First, the axial and circumferential positions of the sensors (as well as pitch angle relative to radial) is typically critical to the integrity of the measurement. Accordingly, the machining of the radial holes must be performed with such precision that it can typically only be achieved in a controlled setting in a factory or machine shop. Portable tooling for drilling radial holes has been provided, but its use is complex, expensive, and may be unreliable. Furthermore, each radial hole must be oriented to point inward, towards a centerline of rotation of the rotor of the turbomachine. During the machining, the turbomachine half-shell casing is typically separated from the rest of the machine, which requires aiming a machining tool at a virtual point in space, making it very difficult to achieve any level of precision. In this case, the location of the turbomachine centerline must be inferred using other physical features on the half-shell casing. It is also exceptionally difficult, if not impossible, to verify whether the installed probe is truly radially oriented when machining is complete. This uncertainty introduces the possibility of erroneous data or misinterpretation of the measurement.

In many instances, more than one radial hole is required to create an array of sensors to attain more information, e.g., six to twenty per stage. Consequently, portable tooling requires a new setup for each and every radial hole, including checks prior to performing the machining. This process is incredibly time consuming, and prevents quick turnaround to return the turbomachine to operation. However, where a number of sensors are employed, the number of sensors has to be limited to prevent diminishing the mechanical integrity of the casing. Furthermore, irregular or asymmetric holes patterns are typically avoided because they can create non-uniform stress distributions.

Another challenge with conventional sensor positioning includes avoiding drilling into the many possible obstacles on the exterior of the casing. Obstacles may include pipes, insulation, flanges, lifting lugs, other instrumentation, bolts, or any other physical object in close proximity to the casing. These obstacles may prevent the positioning of a sensor in the optimal location, possibly jeopardizing the measurement. In addition, the tooling can be quite heavy and difficult to move. It is also common practice to remove unnecessary sensors from a turbomachine when they are not needed to reduce possible leak locations. To reduce the risk of a leak, it is typical for the sensors to be removed and the opening plugged with a more robust device.

Another challenge with the current sensor approach is that it prevents the use of two measurement points or two different types of sensors in the same location because it is typically not feasible to drill two or more radial penetrations in the casings within a prescribed distance from one another. When sensors are oriented radially, projecting outward from the outer surface of the casing, the often delicate instrumentation is highly susceptible to damage.

Another sensor integration approach provides passive sensors on the rotating blade inside the casing. Typically, such sensors are powered by circumferentially spaced power transmission elements, e.g., coils, and antennae. These sensors provide multiple, intermittent measurements as the rotating blade rotates, i.e., once per revolution. Obtaining useful data on quickly changing physical properties such as strain, requires measurements to be completed at a very high frequency, e.g., 300 MHz, which cannot be achieved on a per revolution basis. Current passive sensors also must be very close to the antenna that receive data from the sensors in order for them to work property, which can be very challenging on a turbomachine.

BRIEF DESCRIPTION OF THE INVENTION

A first aspect of the disclosure provides a casing for a turbomachine, the casing comprising: a casing body including an interior surface and an exterior surface; at least one sensor coupled relative to the interior surface of the body, the at least one sensor at most only partially extending through the body; and a communications lead operatively coupled to the at least one sensor, wherein the communications lead extends circumferentially along the interior surface of the body.

A second aspect of the disclosure provides a method comprising: removing a first portion of a body of a turbomachine from a second portion of the body, the casing body including an interior surface and an exterior surface; coupling at least one sensor relative to the interior surface of at least one of the first and second portions of the body, the at least one sensor at most only partially extending through the body; and routing a communications lead operatively coupled to the at least one sensor to extend circumferentially along the interior surface of the body; and re-assembling the first portion to the second portion of the casing.

A third aspect of the disclosure provides a mounting member for a sensor for a turbomachine having an axis, the mounting member comprising: a body configured to mount to a portion of a circumferential interior surface of a casing of the turbomachine; an opening extending through a radially inner surface of the body, the opening configured to position the sensor facing radially inward relative to the axis; and a passage in the body, the passage extending longitudinally through the body to route a communications lead of the sensor circumferentially relative to the circumferential interior surface of the casing.

A fourth aspect of the disclosure provides a sensor system for a turbomachine, the sensor system comprising: a mounting member including a body configured to be mounted to a circumferential interior surface of at least a first portion of a body of the turbomachine; and a sensor coupled to the mounting member and configured to measure an operational parameter of the turbomachine.

A fifth aspect of the disclosure provides a casing for a turbomachine, the casing comprising: a casing body including the circumferential interior surface and an exterior surface; and a sensor system for the turbomachine, the sensor system including: a first mounting member including a body configured to be mounted to the circumferential interior surface of at least a first portion of the body; and a sensor coupled to the first mounting member and configured to measure an operational parameter of the turbomachine.

A sixth aspect of the disclosure includes a mounting system for a tool for machining a half-shell casing of a turbomachine, the mounting system comprising: a base frame including a mounting element configured to fixedly mount the base frame to the half-shell casing, wherein the base frame spans at least a portion of the half-shell casing; and a tool mount including a first end pivotally coupled to the base frame to pivot about a pivot axis that is substantially parallel relative to an axis of the half-shell casing, and a second end configured to couple to and position the tool for machining the half-shell casing.

A seventh aspect includes an optical sensor for a rotating blade stage of a turbomachine, the optical sensor comprising: a housing configured to be mounted relative to a circumferential interior surface of a casing of the turbomachine; at least one optical fiber operatively coupled to the housing for communicating: an optical signal for sending toward the rotating blade stage and a return optical signal reflected by the rotating blade stage, through the casing; an optical signal redirecting element configured to redirect the optical signal from the at least one optical fiber inwardly toward the rotating blade stage relative to the casing, and redirect the return optical signal reflected by the rotating blade stage into the at least one optical fiber, wherein the at least one optical fiber has a longitudinal shape configured to follow the circumferential interior surface of the casing.

An eighth aspect relates to a method of performing an optical analysis of a rotating blade stage of a turbomachine, the method comprising: mounting an optical sensor to a circumferential interior surface of a casing of the turbomachine, the optical sensor including: a housing configured to be mounted relative to the circumferential interior surface of the casing of the turbomachine; at least one optical fiber operatively coupled to the housing for communicating: an optical signal for sending toward the rotating blade stage and a return optical signal reflected by the rotating blade stage, through the casing; a first optical signal redirecting element configured to redirect the optical signal from the at least one optical fiber inwardly toward the rotating blade stage relative to the casing; and a second optical signal redirecting element configured to redirect the return optical signal reflected by the rotating blade stage into the at least one optical fiber, wherein the mounting includes routing the at least one optical fiber to follow the circumferential interior surface of the casing; and performing the optical analysis of the rotating blade stage using the optical sensor.

A ninth aspect of the disclosure provides a wireless sensor antenna system for a turbomachine including a rotating blade including a passive sensor, the wireless sensor antenna system comprising: an antenna extending continuously along a circumferential interior surface of a casing of the turbomachine that surrounds the rotating blade, the antenna configured to receive a return wireless signal from the passive sensor; and a power transmission element extending along the at least portion of the circumferential interior surface of the casing to power the passive sensor by emitting an electromagnetic signal to power the passive sensor.

A tenth aspect includes a method of operation for a wireless sensor antenna system for a turbomachine including a rotating blade including a passive sensor, the method comprising: mounting an antenna extending continuously along a circumferential interior surface of a casing of the turbomachine that surrounds the rotating blade of a casing of the turbomachine that surrounds the rotating blade; mounting a power transmission element extending along the at least portion of the circumferential interior surface of the casing to power the passive sensor with an electromagnetic signal; and measuring a physical property of the rotating blade by powering the passive sensor with the power transmission element and receiving a wireless signal from the passive sensor on the rotating blade at the antenna, the wireless signal including data indicative of the physical property.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 6-8 show enlarged cross-sectional views of sensor system mountings, according to a number of embodiments of the disclosure.

FIG. 10 shows a perspective view of a mounting member for a sensor system in an at least partially circumferentially extending slot, according to embodiments of the disclosure.

FIG. 11 shows a side and top perspective view of a mounting member for a sensor system including axially spaced sensors, according to embodiments of the disclosure.

FIGS. 19-26 show enlarged cross-sectional views of complementary cross-sections of mounting members and slots, according to a number of embodiments of the disclosure.

FIG. 27 shows a perspective view of an optical sensor and mounting member therefor, according to an embodiment of the disclosure.

FIG. 28 shows an exploded perspective view of the optical sensor and mounting member of FIG. 27.

FIG. 29 shows a perspective view of the optical sensor of FIG. 27 mounting in a casing, according to an embodiment of the disclosure.

FIGS. 30-32 show enlarged cross-sectional views of optical sensors and optical fibers therefor, according to a number of embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
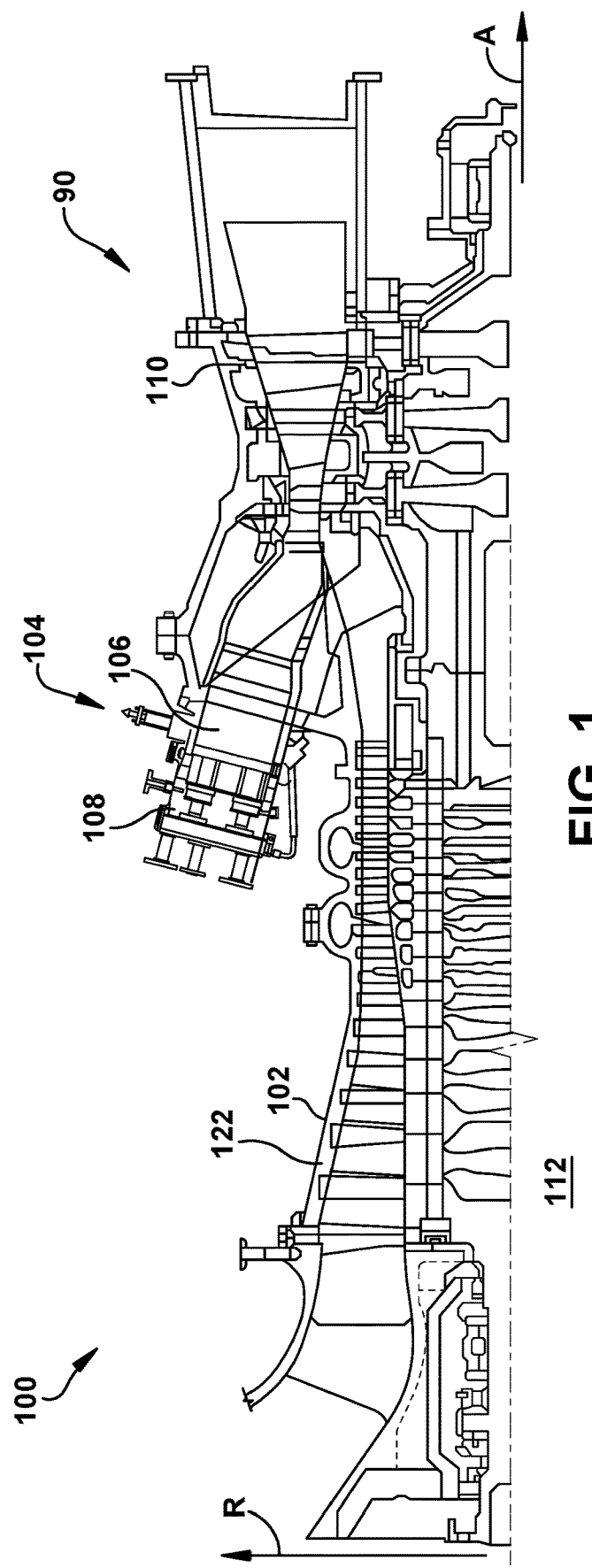
FIG. 1 shows a schematic view of an illustrative turbomachine in the form of a gas turbine system.

As an initial matter, in order to clearly describe the current disclosure it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the engine. It is often required to describe parts that are at differing radial positions with regard to a center axis. The term "radial" refers to movement or position perpendicular to an axis, e.g., an axis of a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard"

of the second component. The term "axial" refers to movement or position parallel to an axis, e.g., an axis of a turbomachine. Finally, the term "circumferential" refers to movement or position around an axis, e.g., a circumferential interior surface of a casing extending about an axis of a turbomachine. It will be appreciated that such terms may be applied in relation to the axis of the turbomachine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Where an element or layer is referred to as being "on," "engaged to," "disengaged from," "connected to" or "coupled to" or "mounted to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

I. General Introduction

The disclosure provides various embodiments of methods, systems and ancillary structures and tools for enabling use of sensor(s) within a circumferential interior surface of at least part of a turbomachine casing. In one embodiment, a sensor or an array of sensors may be positioned on the circumferential interior surface of the casing with the communication leads from the sensor(s) being routed in the circumferential direction to one or more exit openings that act as points of egress. The sensors and their communication leads may be at least partially embedded in the casing, possibly utilizing a mounting member (e.g., a track, housing, or carrier), which fits within a slot machined in the circumferential interior surface, i.e., the inner diameter, of the casing in the circumferential direction. The sensor(s) may alternatively be surface-mounted to the circumferential interior surface of the casing using adhesive, straps, or other means of securing. The sensors may provide discrete or continuous measurement points.

Embodiments of the disclosure provide sensor(s) positioned on a circumferential interior surface of a casing without machining radial penetrations and that provide a number of advantages over conventional radially mounted sensors. The sensor(s) can be located at the measurement point of interest and the associated communication leads can be routed in the circumferential direction. The communication leads for the sensor(s) at a given turbomachine stage may be grouped and routed to a common point of egress through the casing, and to their respective data acquisition systems. This minimizes the number of penetrations through the wall of the casing. For blade tip timing and blade tip clearance measurements, both of which are non-contact sensor systems, sensor(s) may be installed on the circumferential interior surface of the casing in the plane of the rotating blades.

In alternative embodiments of the disclosure, a circumferentially-routed device may not have sensing capability, but may provide ancillary functions, such as an antenna, tube, wire, optical fiber, or other supporting elements. Other embodiments of the disclosure provide an optical sensor capable of use on the circumferential interior surface of the casing, and a tool for forming, among other things, a circumferentially extending slot on the circumferential interior surface of the casing.

II. Introduction to Turbomachine and Casing

FIG. 1 shows a schematic illustration of an illustrative industrial machine 90 in the form of a turbomachine 100. In this example, turbomachine 100 is in the form of a combustion or gas turbine system. Turbomachine 100 includes a compressor 102 and a combustion region 104. Combustion region 104 includes a combustor 106 and a fuel nozzle assembly 108. Turbomachine 100 also includes a turbine assembly 110 and a common compressor/turbine rotor 112 (sometimes referred to as a shaft). In one embodiment, the combustion turbine system is a MS7001FB engine, sometimes referred to as a 7FB engine, commercially available from General Electric Company, Greenville, S.C. The present disclosure is not limited to any one particular industrial machine, nor is it limited to any particular combustion turbine system and may be implanted in connection with other engines including, for example, the MS7001FA (7FA), the MS9001FA (9FA), the 7HA and the 9HA engine models of General Electric Company. Furthermore, the present disclosure is not limited to any particular turbomachine, and may be applicable to, for example, steam turbines, jet engines, compressors, turbofans, etc.

In operation, air flows through compressor 102 and compressed air is supplied to combustion region 104. Specifically, the compressed air is supplied to fuel nozzle assembly 108 that is integral to combustion region 104. Assembly 108 is in flow communication with combustion region 104. Fuel nozzle assembly 108 is also in flow communication with a fuel source (not shown in FIG. 2) and channels fuel and air to combustion region 104. Combustors 106 in combustion region 104 ignite and combust fuel. Combustors 106 are in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there is a plurality of combustors and fuel nozzle assemblies 108.

Figure 2:
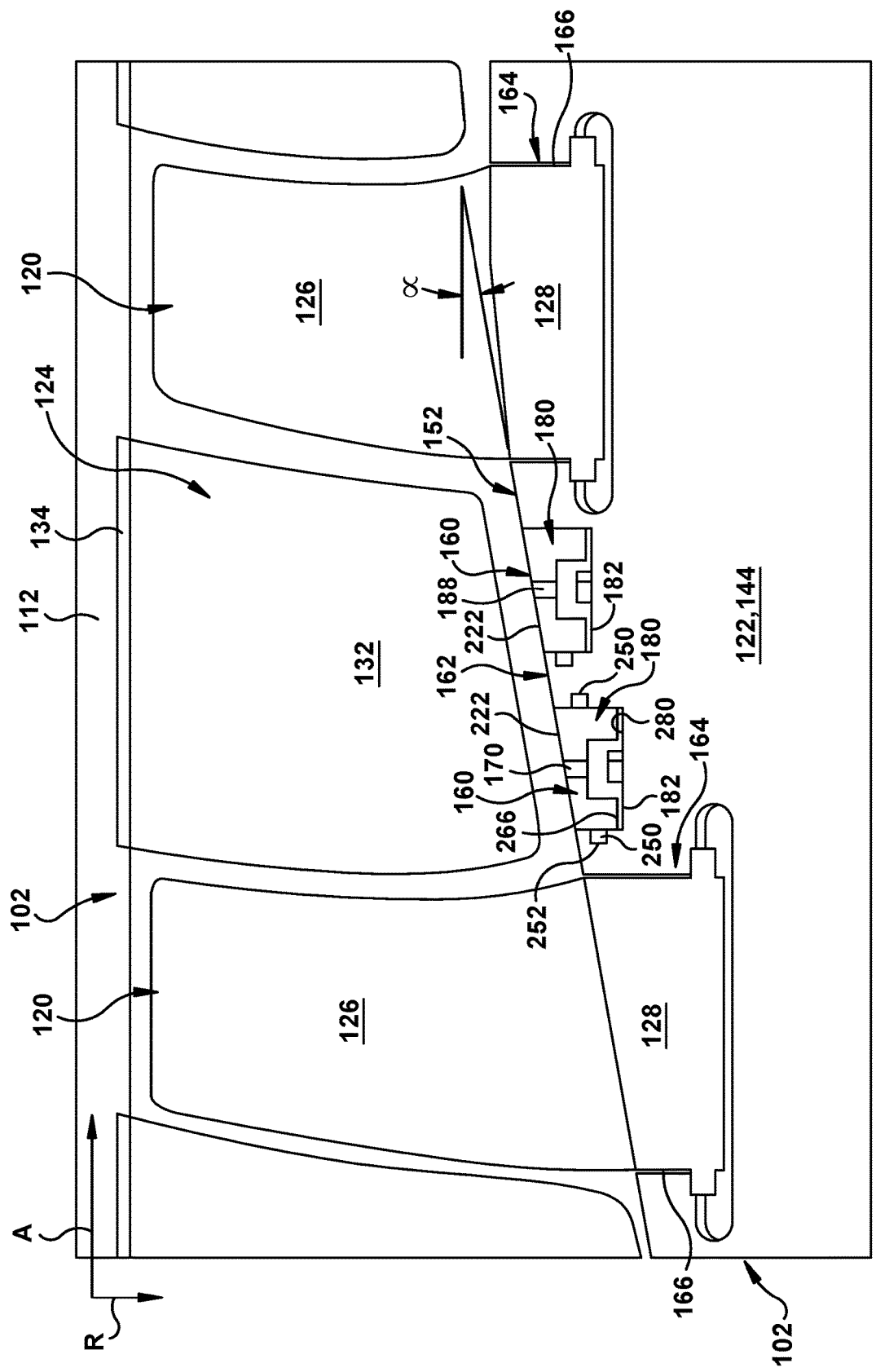
FIG. 2 shows a cross-sectional view of an enlarged portion of an illustrative compressor of the turbomachine of FIG. 1.

FIG. 2 shows a cross-sectional view of an enlarged portion of an illustrative compressor 102 of turbomachine 100 (FIG. 1). FIG. 1 is of a lower cross-section of compressor 102, with rotor 112 above a stationary casing 122. Compressor 102 includes stages 120 of (stationary) nozzles or vanes 126 (two shown) coupled to stationary casing 122 of turbomachine 100 and axially adjacent a stage 124 of rotating blades 132. Casing 122 extends about nozzles 126 and rotating blades 132 and forms a flow path for a working fluid (not shown). Numerous circumferentially spaced nozzles or vanes 126 may each be held in compressor 102 by a radially outer platform 128 in mounts 164 positioned in casing 122. Stage 124 of rotating blades 132 in compressor 102 includes numerous circumferentially spaced rotating blades 132 coupled to rotor 112 and rotating with the rotor. Rotating blades 132 may include a radially inward platform 134 (at root of blade) coupled to rotor 112. While the teachings of the disclosure will be described relative to compressor 102, it is understood that the disclosure may be applied to other industrial machines including rotating parts and other turbomachine parts, e.g., turbine assembly 110.

Figure 3:
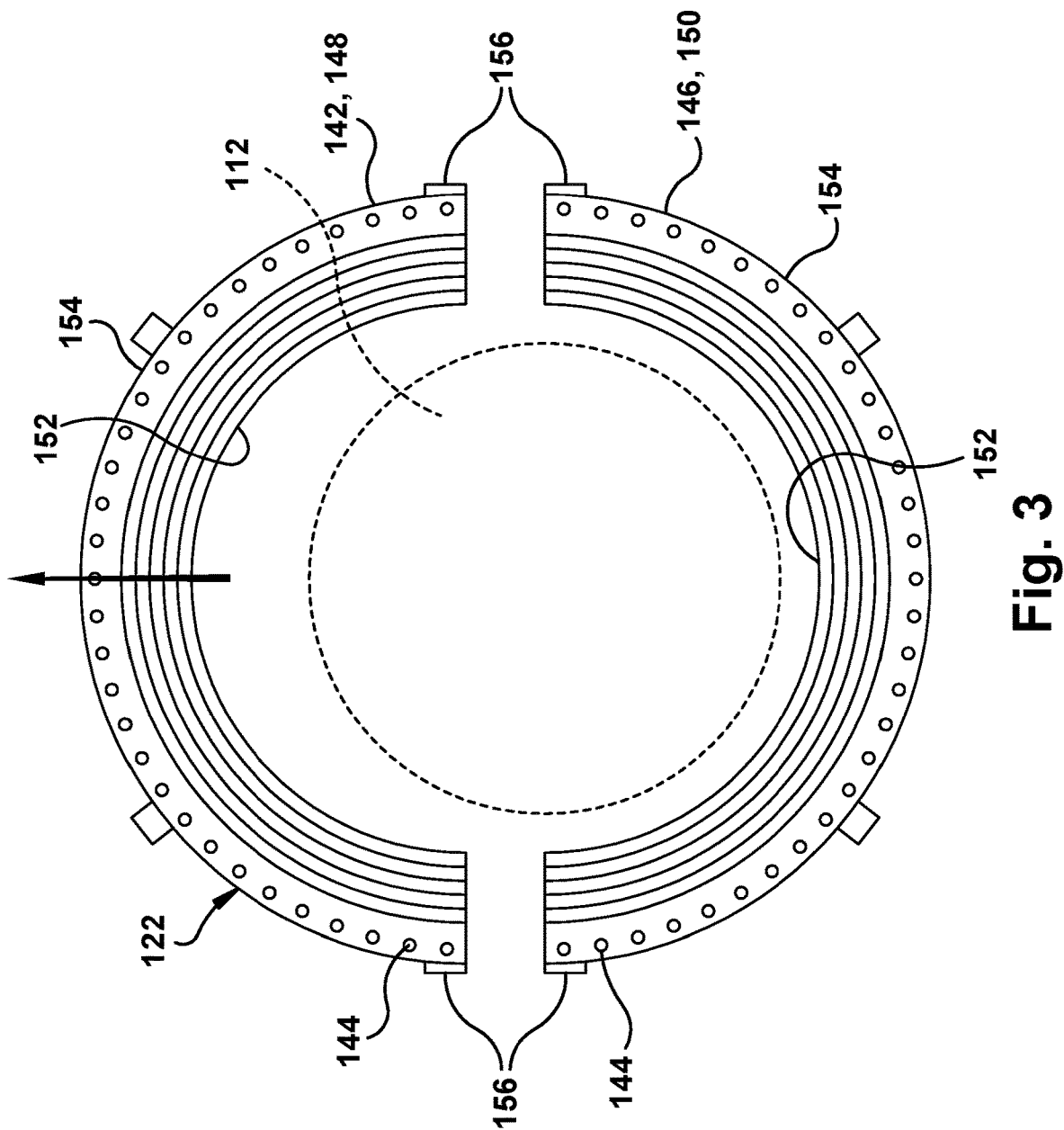
FIG. 3 shows a cross-sectional view of a casing according to embodiments of the disclosure.

FIG. 3 shows a cross-sectional view of a casing 122. In a method according to embodiments of the disclosure, casing 122 includes a casing body 144 having a first portion 142 and a second portion 146. FIG. 3 shows first portion 142 of casing 122 of turbomachine 100 (FIG. 1) being removed from second portion 146. First portion 142 may be removed by removing any necessary ancillary casing equipment (not shown) that extends about first portion 142 (e.g., pipes, insulation, flanges, lifting lugs, other instrumentation, bolts, or any other physical object in close proximity to the casing), unbolting first portion 142 from second portion 146, and lifting second portion 142 away from second portion 142. Embodiments of the disclosure can be advantageously carried out with first portion 142 on-site on a floor in a power plant, or in a manufacturing site. Casing body 144 and each portion 142, 146 include a circumferential interior surface 152 and an exterior surface 154. Portions 142, 146 can take any shape and circumferential extent of casing body 144. In many cases, each portion 142, 146 take the form a half-shell casing 148, 150, e.g., 180° of a circular casing body 144, that can mount together via mating flanges 156 thereof (fasteners not shown). In this case, first portion 142 includes an upper half-shell casing 148, and second portion 146 includes a lower half-shell casing 150. In the field of use of turbomachine 100 (FIG. 1), where first portion 142 is removed, rotor 112 (in phantom in FIG. 3) may remain in second portion 146. Here, sensor systems according to embodiments of the disclosure may be applied to first portion 142, alone. Alternatively, in certain embodiments, rotor 112 may be removed so sensor systems according to the disclosure can be applied to second portion 146 alone, or to both first and second portion 142, 146.

Figure 4:
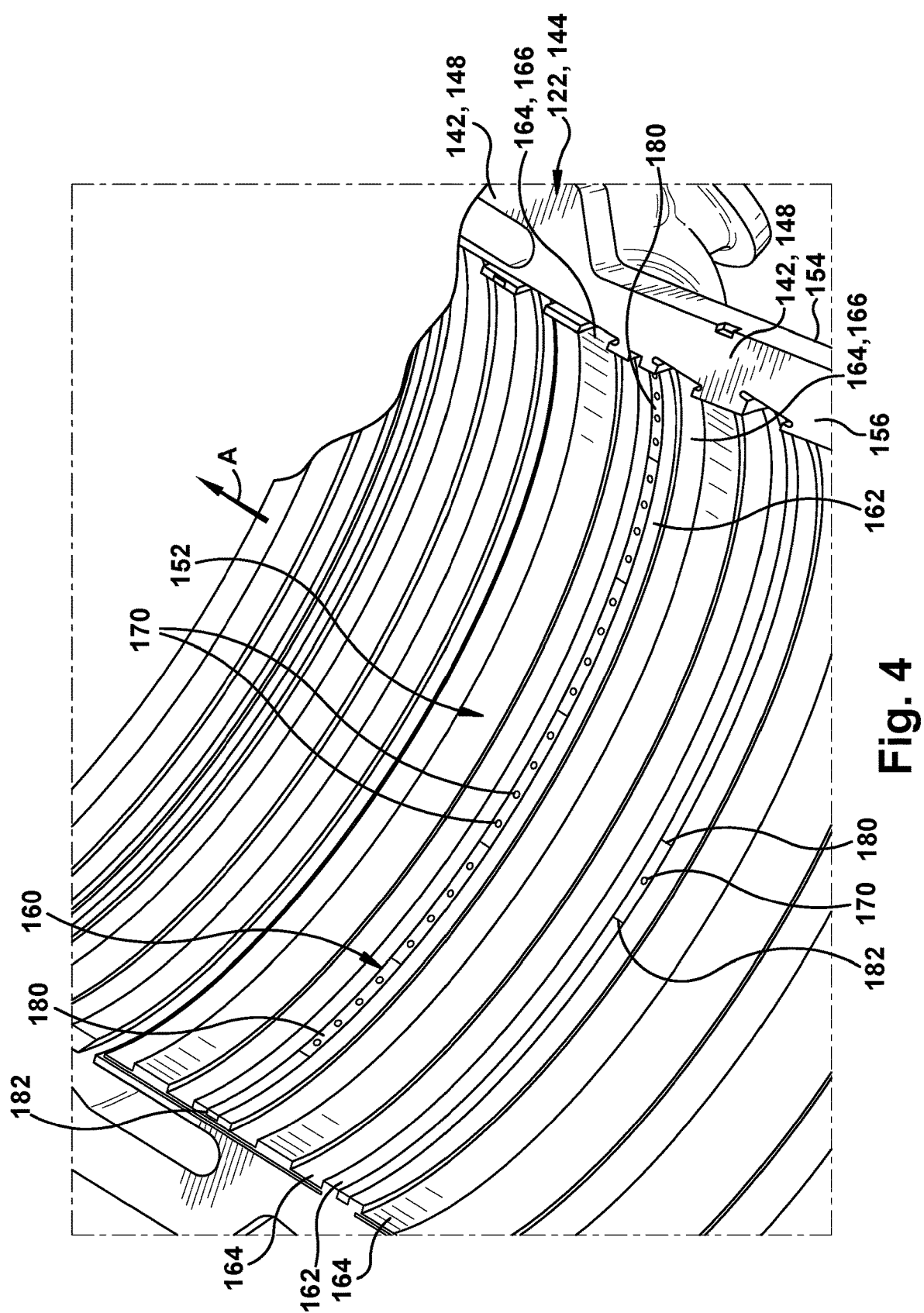
FIG. 4 shows a perspective view of an illustrative half-shell casing including a sensor system, according to one embodiment of the disclosure.
Figure 5:
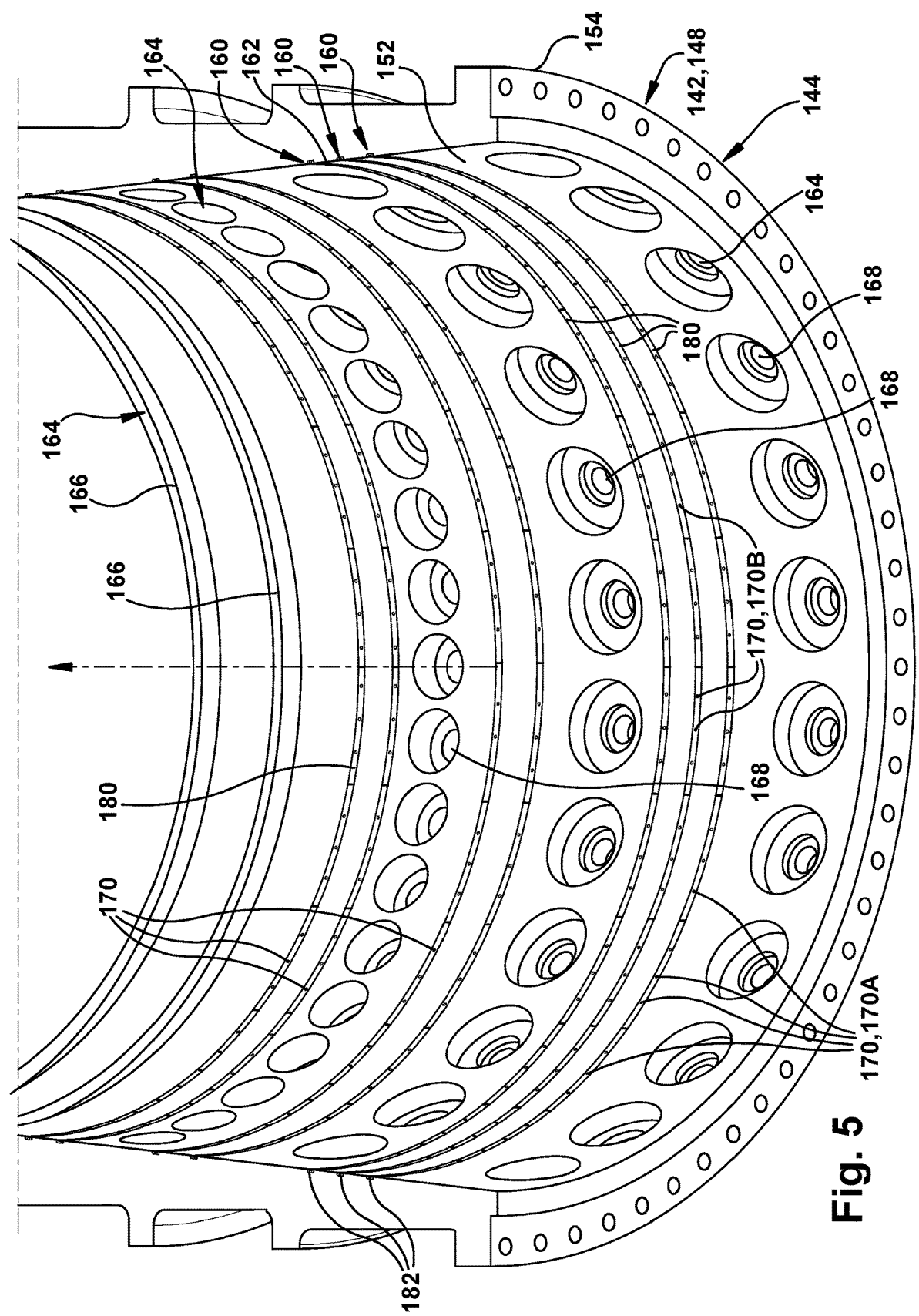
FIG. 5 shows a perspective view of an illustrative half-shell casing including a number of sensor systems, according to one embodiment of the disclosure.

III. Sensor System on Circumferential Interior Surface of Casing and Related Method FIGS. 4 and 5 show an illustrative half-shell casing, e.g., 148, removed from turbomachine 100 (FIG. 1) and including a sensor system 160 according to one embodiment of the disclosure. FIG. 4 shows a single sensor system 160, and FIG. 5 shows a number of axially spaced sensor systems 160. As observed in FIGS. 2, 4 and 5, circumferential interior surface 152 may take a variety of forms depending on, for example, the type of nozzles 126 (FIG. 2) employed, the stage of compressor 102 or turbine assembly 110, and the type and or size of turbomachine 100. Generally, circumferential interior surface 152 may include any portion of an inner surface or inner diameter of casing body 144 that extends in a circumferential manner, i.e., at least partially around an axis A of turbomachine 100 (FIG. 1). "Circumferential interior surface 152" may be referred to herein as "interior surface 152" or "surface 152" for brevity. Sensor system(s) 160 may be mounted in any space 162, for example, between mounts 164 for a pair of stages 120 of nozzles 126, in interior surface 152 of casing body 144. The form of mounts 164 may vary. In FIGS. 2 and 4, and the upper portion of FIG. 5, mounts 164 include a track 166 in which nozzles 126 may be circumferentially inserted (nozzles removed in FIGS. 4 and 5). In other embodiments, as shown in the lower portion of FIG. 5, mounts 164 may include circular openings 168 into which variable vanes/nozzles (not shown) are positioned. (See FIG. 41 for description of how the circular opening 168 alternative is handled). In any event, space 162 extends at least partially about interior surface 152.

FIGS. 2 and 6-8 show cross-sectional views of sensor systems 160 according to various embodiments of the disclosure. Regardless of embodiment, sensor system 160 includes at least one sensor 170 coupled relative to interior surface 152 of casing body 144. Sensor(s) 170 extends at most only partially through casing body 144. That is, sensor (s) 170 extend from interior surface 152 radially outward, but do not penetrate through to exterior surface 154 of casing 122. As will be described in greater detail herein, and as shown best in FIG. 5, sensor system 160 may include sets of sensors 170, e.g., a first set of sensor(s) 170A and one or more second sets of sensors 170B, coupled relative to interior surface 152 of casing body 144. Again, sensors 170 only extend at most partially through casing body 144. Since each sensor 170 extends at most partially through casing body 144, the disadvantages of radially extending sensors described herein are avoided.

A method according to embodiments of the disclosure may include coupling sensor(s) 170 relative to interior surface 152 of first portion 142 (FIGS. 3-5) of casing body 144. That is, sensor(s) 170 may be coupled to first portion 142 alone, after removal from turbomachine 100 (FIG. 1). In addition, or as an alternative, the method may include coupling sensor(s) 170 relative to interior surface 152 of second portion 146 (FIG. 3) of casing body 144, i.e., after removal of rotor 112 (FIG. 3). In any event, sensor(s) 170 at most only partially extend through casing body 144.

Figure 9:
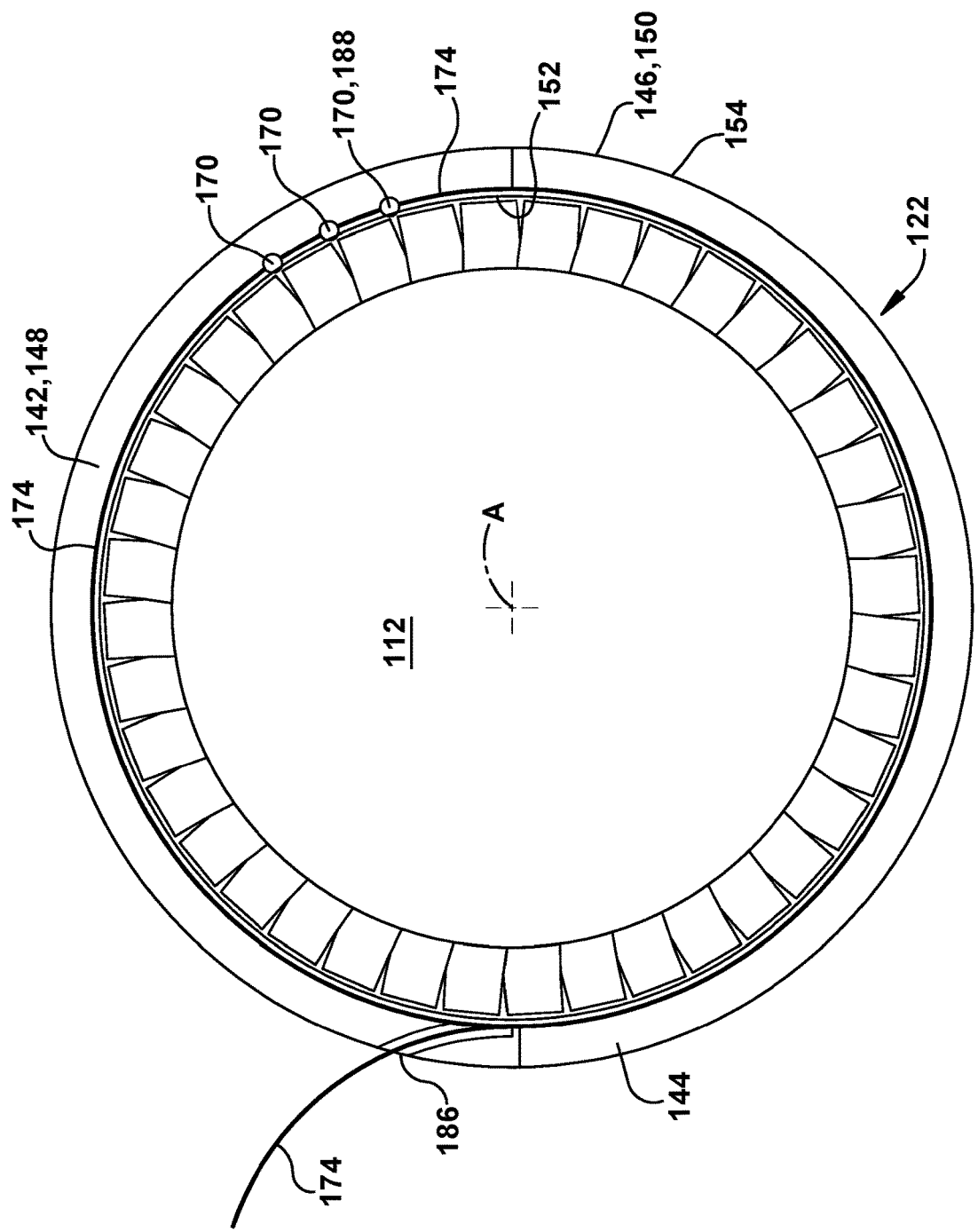
FIG. 9 shows a cross-sectional view of a casing including a sensor system, according to one embodiment of the disclosure.

As will be described herein in greater detail, each sensor 170 includes a communications lead 174 operatively coupled thereto. Communication lead(s) 174 for sensor(s) 170 may be routed to extend circumferentially along interior surface 152 of casing body 144 of casing 122. Advantageously, with casing 122 in a completed, operative state, i.e., with half-shell casings 148, 150 together, any number of communication lead(s) 174 used can exit casing 122 at a single exit opening 186 (FIG. 9). In an alternative embodiment, more than one exit opening 186 (FIG. 9) is provided, but in any event, the number of exit openings is greatly reduced compared to conventional radially extending sensors.

A. Sensor System Mounting

Sensor systems 160 may be mounted to space 162 of interior surface 152, e.g., between mounts 164 for pair of stages 120 of nozzles 126, in a variety of ways. Embodiments of the disclosure provide for coupling sensor(s) 170 relative to interior surface 152 of at least one of first and second portions 142, 146 of casing body 144 of casing 122. Again, each sensor 170 at most extends only partially through casing body 144.

1. Adhering Sensor System

Coupling sensor(s) 170 may include adhering the sensor (s) to interior surface 152 of first portion 142 and/or second portion 146 of casing body 144. Sensor(s) 170 may be coupled in a number of ways. FIG. 6 shows a cross-sectional view of a sensor system 160 in which sensor(s) 170 is/are coupled relative to interior surface 152 of casing body 144 by an adhesive element 172. That is, sensor(s) 170 is/are coupled relative to interior surface 152 of casing body 144 in space 162 between mounts 164 for pair of stages 120

(FIG. 2) of nozzles by adhesive element 172. Adhesive element 172 may also adhere communication leads 174 along interior surface 152. Any necessary openings in adhesive element 172 may be provided to expose sensors 170. Adhesive element 172 may include any form of adhesive capable of withstanding the environment in which employed, e.g., a glue, a polymer, tape, etc. In another embodiment, sensors 170 could be fixedly coupled to interior surface 152, e.g., using Nichrome strips spotted welded to the casing.

2. Partially Embedding Sensor System

Coupling sensor(s) 170 may include at least partially embedding them in interior surface 152. FIG. 7 shows a cross-sectional view of sensor system 160 in which sensor(s) 170 is/are at least partially embedded in interior surface 152 of casing body 144 in space 162, e.g., between mounts 164 for pair of stages 120 (FIG. 2) of nozzles (not shown). Each sensor 170 may be positioned in a respective individual slot 176, or a plurality of sensors 170 may be positioned in a continuous slot 176. Slot(s) 176 may have any shape configured to receive one or more sensors 170. In the example shown, slot(s) 176 is mostly circular, and sensor(s) 170 and/or communication leads 174 are configured to fit within slot(s) 176. A protective cover 178 may be employed to protect sensor(s) 170 in this setting with any necessary openings required to expose sensor(s) 170 provided therein. Protective cover 178 may include, for example, a Nichrome strip.

3. Mounting Sensor System with Mounting Member

FIGS. 2, 4, 5, 8 and 10-26 show details of an embodiment of the disclosure in which sensor(s) 170 may be mounted in a mounting member or track that is mounted to circumferential interior surface 152 of casing body 144. FIGS. 4 and 5 show perspective views of mounting member(s) 180 in casing body 144 of casing 122, and FIG. 8 shows a cross-sectional view of sensor system 160 in which a mounting member or track 180 is provided. FIG. 4 shows one circumferential arrangement of mounting member(s) 180, and FIG. 5 shows numerous axially spaced, circumferential arrangements of mounting member(s) 180, i.e., numerous sensor systems 160 within the same circumferential interior surface 152. In this embodiment, mounting member 180 is configured to be mounted relative to circumferential interior surface 152 of casing body 144 in space 162 between mounts 164 for pair of stages 120 (FIG. 2) of nozzles. Coupling sensor(s) 170 according to this embodiment may include mounting the mounting member 180 in a slot 182 in interior surface 152 of the at least one of first and/or second portions 142, 146 of casing body 144. Slot 182 may be a discrete, planar slot as shown in a lower end of FIG. 4, or as shown in an upper end of FIG. 4 and in FIG. 5, slot 182 may be an elongated and at least partially circumferentially extending slot. In either case, mounting member 180 may be positioned in slot 182 (i.e., a discrete, planar slot or in at least partially circumferentially extending slot 182) in space 162 in interior surface 152 between the mounts for the pair of the plurality of stages of nozzles.

Methods according to embodiments of the disclosure may include forming slot(s) 182 prior to coupling of sensor(s) 170 therein using mounting member(s) 180. Pair of stages 120 (FIG. 2) of nozzles 126 may be removed prior to forming slot 182 in interior surface 152 of casing body 144. Slot 182 may be formed using any now known or later developed technique, e.g., machining. In one embodiment, where slot 182 includes an at least partially circumferentially extending slot in space 162 in circumferential interior surface 152, the slot may be formed using a tool and method as described in Section I herein. In any event, slot 182 extends at most only partially through casing body 144, i.e., it extends only partially (radially) between circumferential interior surface 152 and exterior surface 154 of casing body 144 and does not extend through exterior surface 154 of casing body 144. Consequently, sensor system 160 will not extend through casing body 144, in contrast to conventional radially extending sensor systems.

Figure 12:
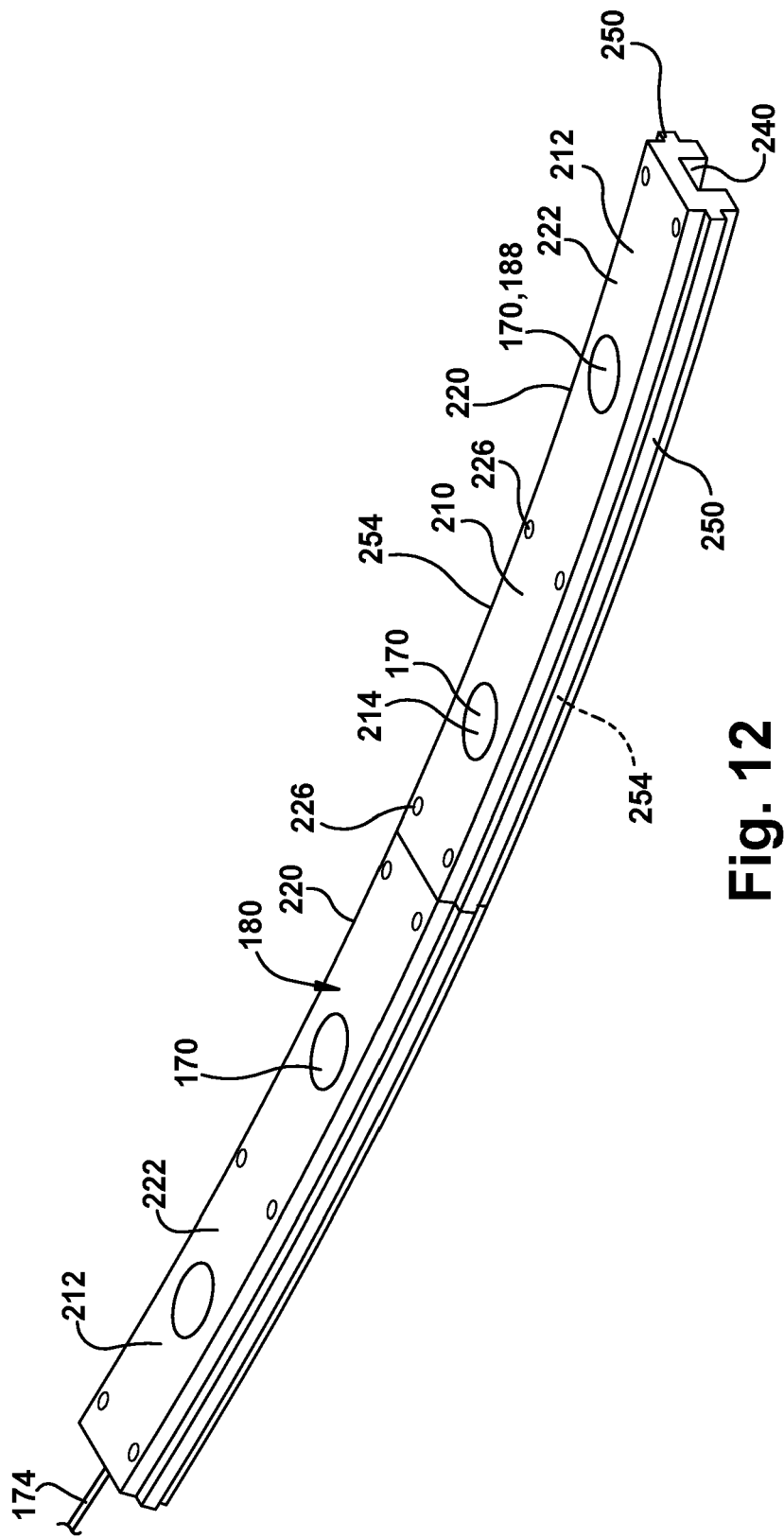
FIG. 12 shows a side and top perspective view of a mounting member for a sensor system including circumferentially spaced sensors, according to embodiments of the disclosure.
Figure 13:
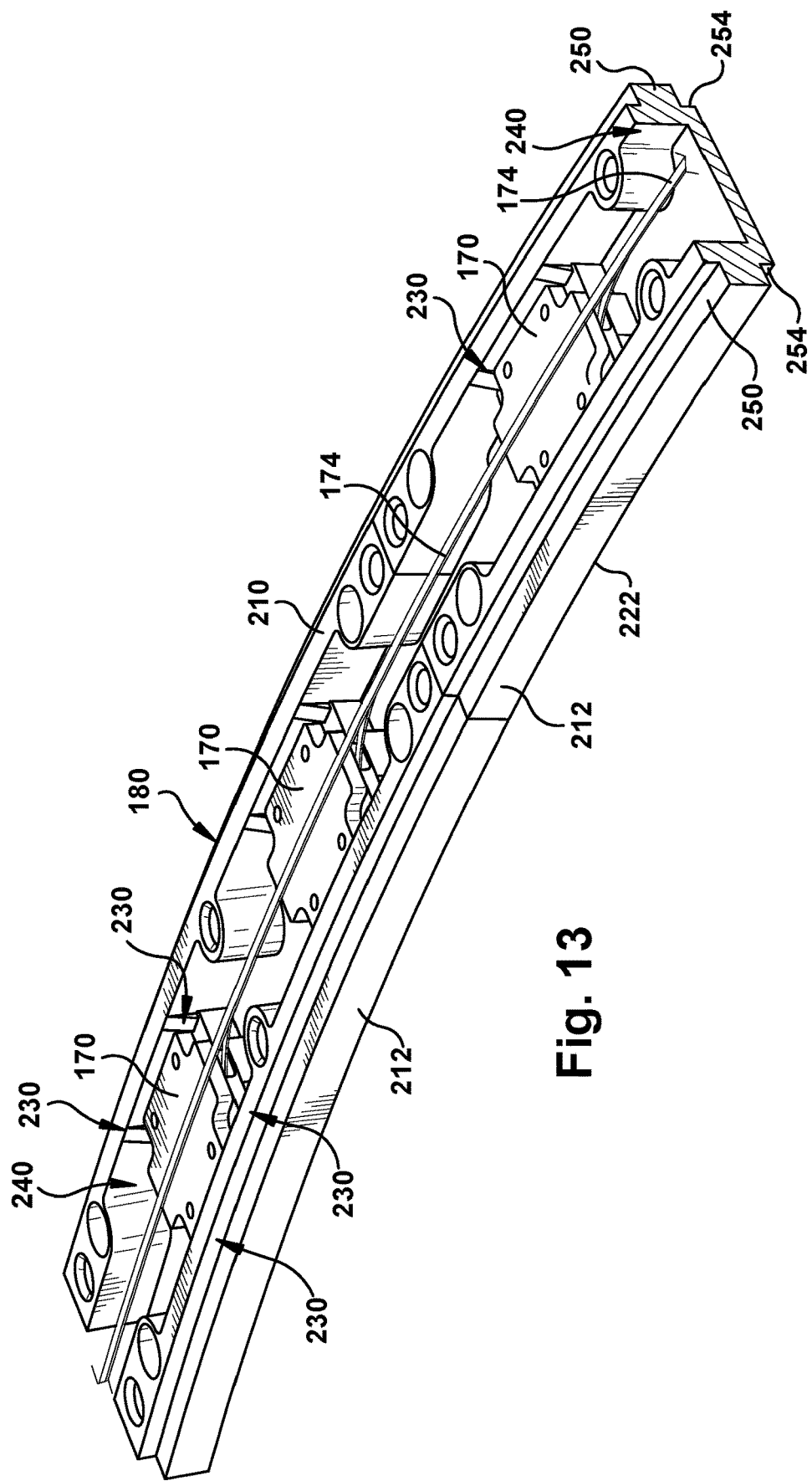
FIG. 13 shows a side and bottom perspective view of the mounting member of FIG. 12.
Figure 14:
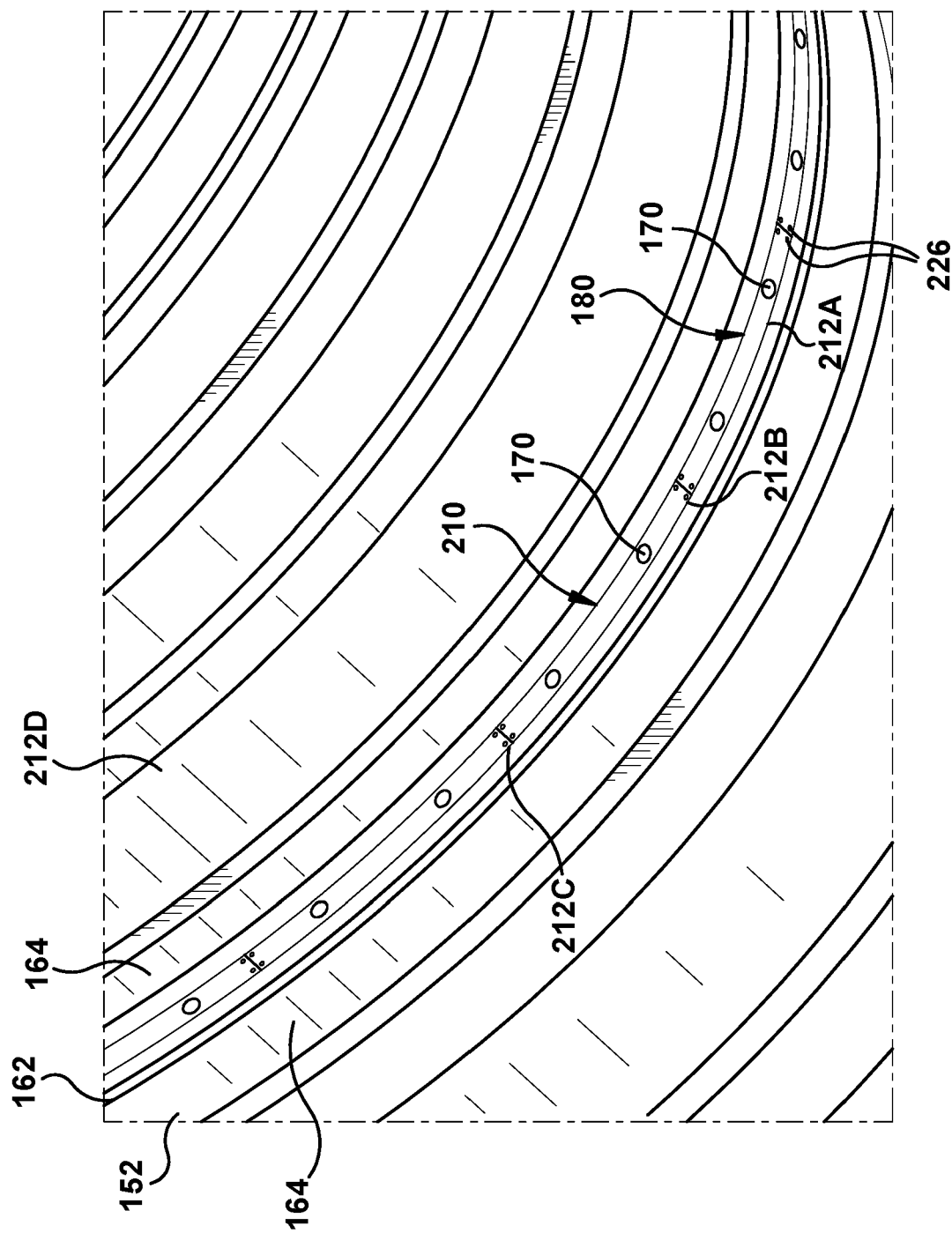
FIG. 14 shows an enlarged perspective view of an illustrative half-shell casing including a sensor system with multiple mounting members including arcuate portions, according to one embodiment of the disclosure.

Referring to FIGS. 10-26, details of mounting member 180 for sensor(s) 170 for turbomachine 100 (FIG. 1) according to various embodiments will now be described. FIG. 10 shows a perspective view of mounting member 180 in slot 182 with stage 120 of rotating blades 132; FIG. 11 shows a side and top perspective view of mounting member 180 including axially spaced sensor(s) 170 apart from a slot; FIG. 12 shows a side and top perspective view of mounting member 180 including a single row of sensor(s) 170; and FIG. 13 shows a side and bottom perspective view of mounting member 180 of FIG. 12, according to one embodiment.

In this mounting embodiment, sensor system 160 may include mounting member 180 including a body 210 configured to be mounted to circumferential interior surface 152 of at least a portion of casing 122 of turbomachine 100 (FIG. 1). Sensor(s) 170 is/are coupled to mounting member 180 and configured to measure an operational parameter of the turbomachine. Where body 210 will extend along a portion of circumferential interior surface 152 of casing 122 that is sufficiently elongated to require curvature of body 210 (e.g., for ease of mounting and/or to prevent excessive penetration into casing body 144), body 210 may have a radius of curvature R substantially matching the portion of circumferential interior surface 152 of casing 122 of turbomachine 100 (FIG. 1). More particularly, body 210 of first mounting member 180 may include an arcuate portion 212 having a radius of curvature R substantially matching, i.e., the same or nearly the same as, a radius of curvature R of circumferential interior surface 152. The length of arcuate portion 212, i.e., the degrees of curvature over which it extends, may vary. For example, arcuate portion(s) 212 could extend 5°, 10°, 20°, 30°, 45°, 90°, or any value up to the degrees of curvature of first or second portion 142, 146 of casing 122 to which it is to be mounted. As shown in FIGS. 4 and 5, where portions 142, 146 represent half-shell casings 148, 150 (FIG. 3), a single arcuate portion 212 therefor may extend 180° degrees. In some embodiments, as shown best in the perspective view of FIG. 14, body 210 of mounting member 180 may include a plurality of arcuate portions 212 having radius of curvature R substantially matching the portion of circumferential interior surface 152 of casing 122 of turbomachine 100 (FIG. 1). As will be described in greater detail, each arcuate portion 212 is mounted in slot 182 to collectively provide sensor(s) 170 along a desired circumferential extent of circumferential interior surface 152. Any number of arcuate portions 212 may be employed to cover the desired circumferential extent of slot 182. For example, as noted, a single arcuate portion 212 may cover up to 180° of a 180° slot 182. Alternatively, five arcuate portions may cover 9° each of a 45° slot 182; ten arcuate portions 212 may cover 18° each of a 180° slot 182; one arcuate portion may cover 10° of a 10° slot 182 (see e.g., lower portion of FIG. 4); or four arcuate portions 212 may cover 15° of a 90° slot 182, etc. Where sensor(s) 170 are not desired but a slot 182 exists, 'dummy' arcuate portions with no sensors therein and no openings 220 therein may be employed to fill the slot, provide a continuous passage 240 for communications link 174, and provide a continuous circumferential interior surface for casing 122. In one embodiment, mounting member(s) 180 may be circumferentially fixed using set screws (not shown) extending through openings 226 therein into the casing.

Figure 16:
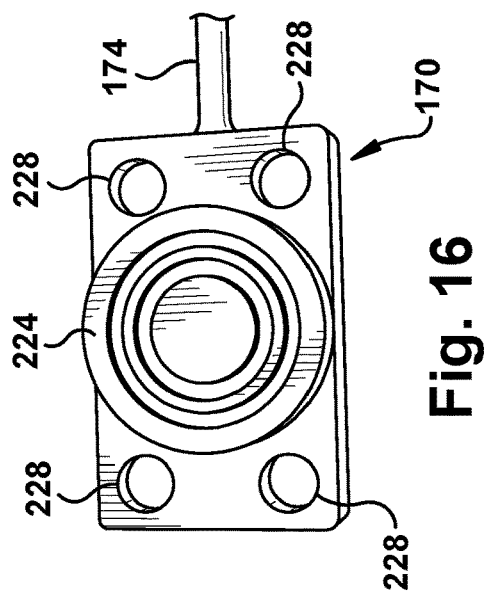
FIG. 16 shows a perspective view of an illustrative sensor, according to embodiments of the disclosure.
Figure 15:
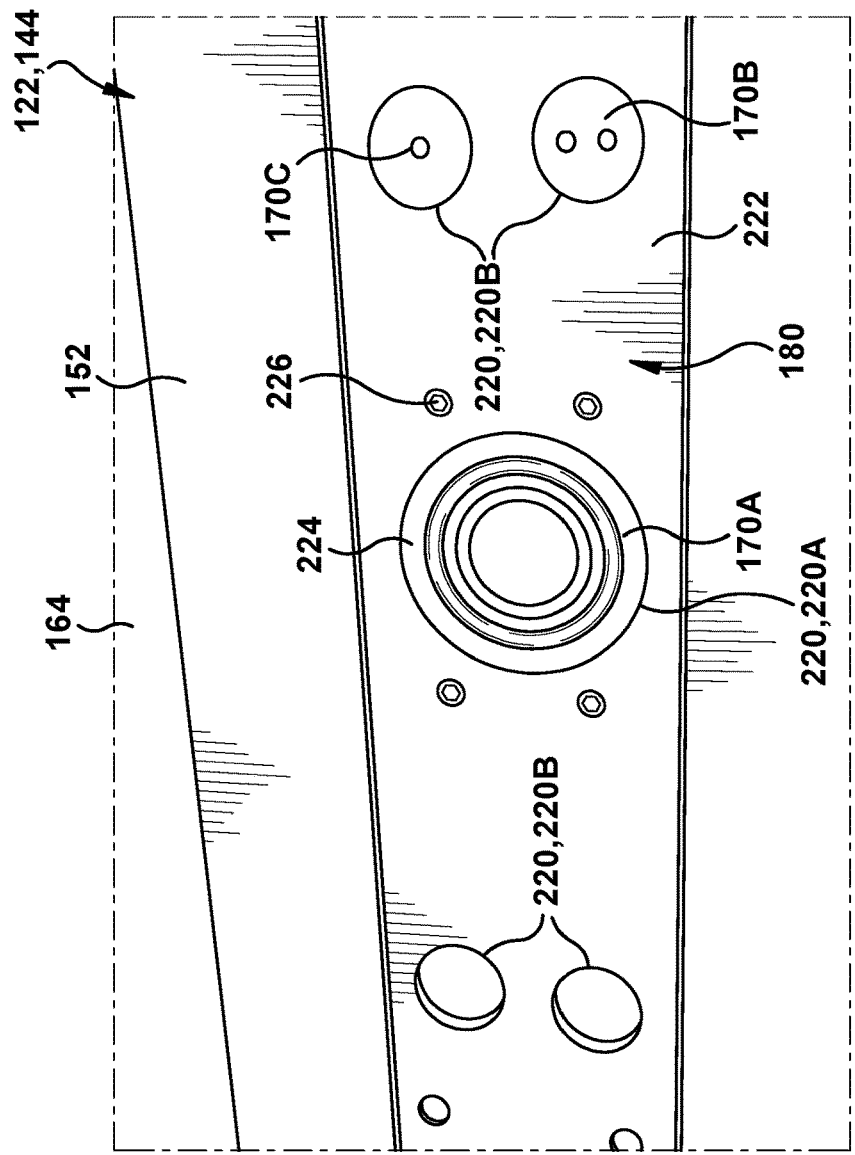
FIG. 15 shows an enlarged perspective view of an illustrative mounting member with a sensor therein, according to embodiments of the disclosure.
Figure 17:
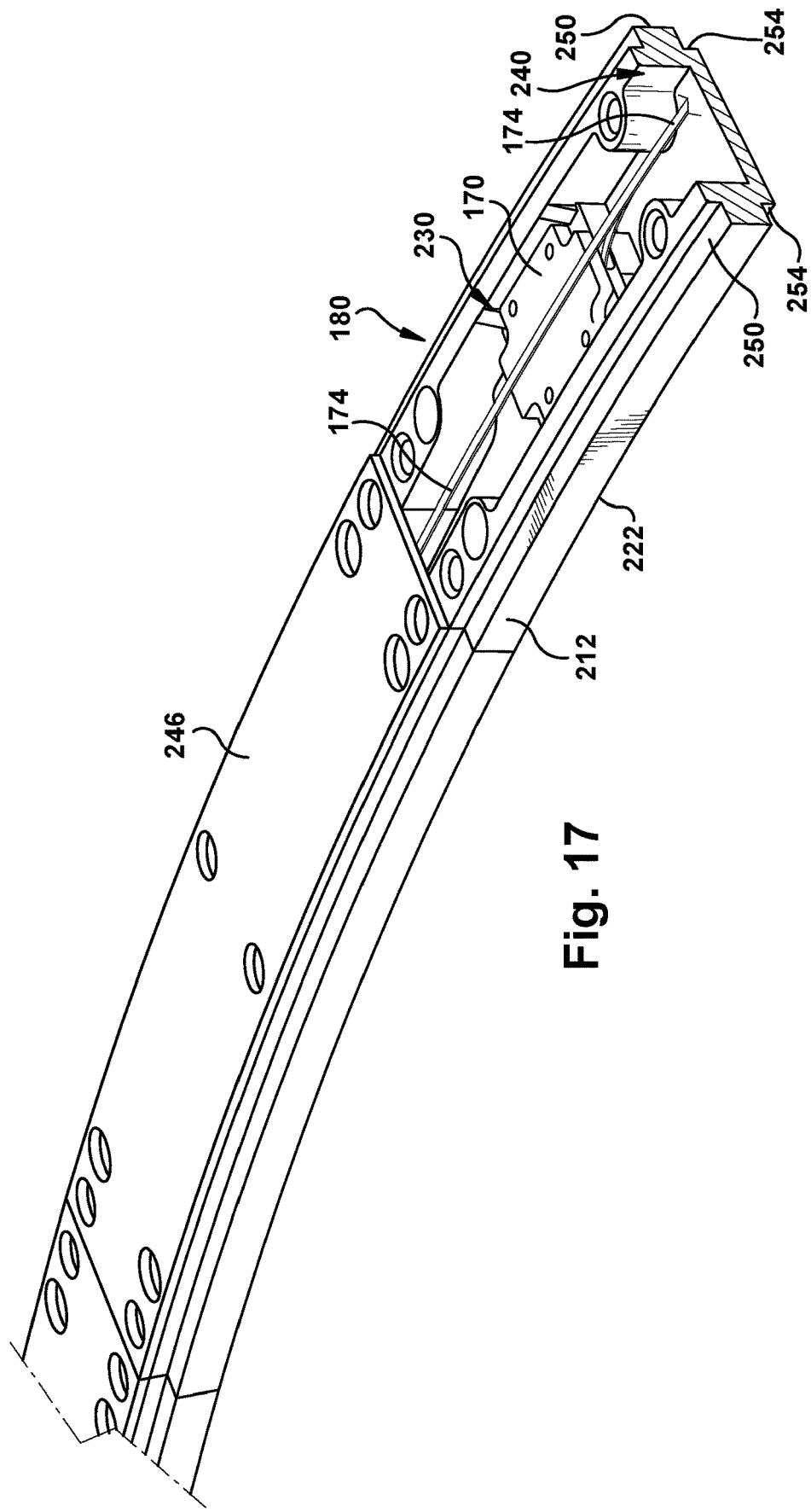
FIG. 17 shows a side and bottom perspective view of the mounting member of FIG. 12 with a cover, according to an embodiment of the disclosure.

Referring to FIGS. 12, 15 and 16, mounting member 180 may also include an opening 220 extending through a radially inner surface 222 of body 210. Each opening 220 may be configured to position a respective sensor 170 (or part thereof) facing radially inward relative to axis A (FIG. 12 only). Opening 220 may provide an active part of mounting and/or positioning a respective sensor 170, or it may just allow sensor 170 to be exposed radially inward. In the examples in FIGS. 12, 15 and 16, sensor 170 includes a sensor head 224 configured to seat in opening 220 (e.g., circular sensor head in circular opening); however, this is not necessary in all instances. In one embodiment, such as shown in FIG. 12, opening(s) 220 for a single type of sensor 170 is provided, e.g., tip timing laser probe or clearance probe. Alternatively, as shown in FIG. 15, more than one type of opening 220 may be provided in each mounting member 180, e.g., a single opening 220A for sensor(s) 170 requiring only one opening like a proximity sensor, or for example, two axially spaced openings 220B for a time-of-arrival optical sensor that includes a sender and a receiver (not shown, see e.g., FIG. 27-30). Axially spaced openings 220B may also position different types of sensors. For example, in the FIG. 15 embodiment, opening 220A can position a sensor 170A such as a capacitive sensor, one of openings 220B can position a single tip timing probe 170B including a pair of optical fibers (one for send and one for receive, see e.g., FIG. 31), and a second of openings 220B can position, axially offset from timing probe 170B, a completely independent laser probe 170C with its own send and receive optical fibers. (While the send and receive optical fibers may be in extremely close proximity, it is conceivable that the send optical fiber and the receive optical fiber could be separated, each having their own opening 220 interfacing with the flow path.) Any number of openings 220 can be provided for a single type of sensor, or for a number of different sensors. Mounting member 180 can be made wider to accommodate any number of axially spaced openings/sensors. Where more axially spaced sensors are desired, more than one sensor system 160 can be employed in an axially spaced arrangement. Openings 220 may have any radially inward facing structure desired to assist in directing signals from sensor(s) 170 or protecting the sensors. For example, as shown in FIG. 11, a radially inner portion 234 of opening 220 may be beveled, rounded, angled, etc. Other radially inward facing structures, such as protective covers, are also possible.

Mounting member 180 may include any now known or later developed mechanism for holding sensor(s) 170 in place. In FIGS. 12 and 15, sensor(s) 170 may be held in place, for example, by threaded fasteners in openings 226 extending through radially inner surface 222 of body 210. FIG. 16 shows a perspective view of sensor 170 including complementary threaded fastener receptacles 228. As also shown in FIG. 16, each sensor 170 may include a communications lead 174 operatively coupled thereto, or each sensor 170 may share a communications lead 174 with other sensors 170. While a particular mechanism to position sensor(s) 170 has been described, a wide variety of alternative mechanisms may be employed. For example, as shown in FIG. 13, sensor(s) 170 may be snap-fit into seats 230, e.g., with flexible wedges, in body 210. In this setting, openings 226 for attaching sensor(s) 170 may be omitted. Sensor(s) 170 can also be connected by any other form of fastener, adhesive, complementary male-female connections, etc.

As shown in FIGS. 12 and 13, mounting member 180 also includes a passage 240 in body 210. Passage 240 may extend longitudinally through body 210 to allow routing of communications lead(s) 174 of sensor(s) 170 circumferentially relative to the circumferential interior surface 152 (e.g., FIGS. 10, 14) of casing 122, and within slot 182. In this manner, a communications lead 174 can be operatively coupled to each sensor 170, and passage 240 may be used to route the communications leads 174 in a circumferential direction of casing 122, protecting the leads from the environment inside the casing. Passage 240 may also provide space for sensor(s) 170 therein. Passage 240 may have any desired cross-sectional shape, e.g., square, rectangular, semi-circular, etc., and may have any size required to, for example, position sensor(s) 170 and/or route communications lead(s) 174. In one embodiment, as shown in the side and bottom perspective view of FIG. 17, mounting member 180 may include a cover 246 that encloses passage 240. Cover 246 may be coupled to body 210 in any known fashion, e.g., threaded fasteners, welding, male-female connectors, etc. Cover 246 can be made of the same material as body 210.

Figure 18:
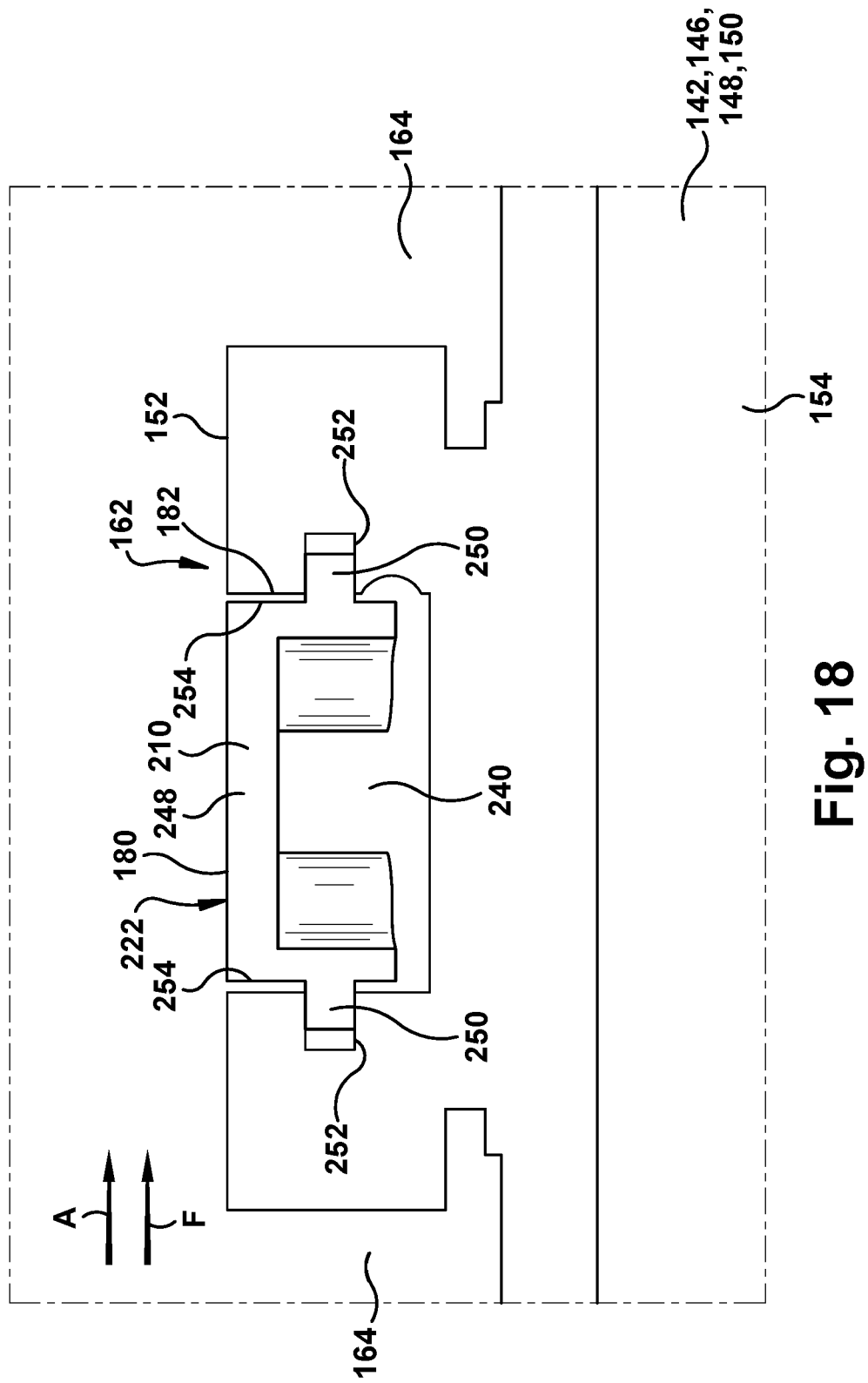
FIG. 18 shows a cross-sectional view of an illustrative a mounting member and a slot in a circumferential interior surface in a space between pair of mounts for stages of rotating blades, according to embodiments of the disclosure.

As noted, coupling mounting member 180 to circumferential interior surface 152 may include mounting arcuate portion(s) 212 in at least partially circumferentially extending slot 182 in circumferential interior surface 152, e.g., by circumferentially inserting one or more arcuate portions 212 into slot 182. Mounting member 180 and body 210 thereof may take a variety of forms to implement the mounting. FIG. 18 shows a cross-sectional view of an illustrative mounting member 180 and a slot 182 in circumferential interior surface 152 in space 162 between pair of mounts 164. In one embodiment, illustratively shown in FIG. 18, body 210 may have a cross-section configured to mate with a complementary cross-section of at least partially circumferentially extending slot 182 in circumferential interior surface 152 of casing 122, creating complementary cross-sections.

As used herein, "complementary" does not necessary indicate a perfect size and shape match, but only that the cross-sections interact to provide a number of advantageous functions. First, the cross-section of body 210 and the complementary cross-section of slot 182 may interact to fix body 210 relative to circumferential interior surface 152, e.g., radially and axially. For example, the complementary cross-sections may interact to prevent mounting member 180 from moving radially relative to circumferential interior surface 152. Further, the complementary cross-sections may interact to fix mounting member 180 relative to circumferential interior surface 152 such that circumferential interior surface 152 of casing 122 and radially inner surface 222 of body 212 are substantially coplanar. In this manner, a flow F (FIG. 18) of working fluid thereover is not interrupted by mounting member 180. Body 210 and any arcuate portions 212 thereof may be fixed circumferentially in a variety of manners. For example, as noted, mounting member 180 may extend 180°, either as a single arcuate portion 212 or with many arcuate portions 212, about a half-shell casing 148, 150 (FIG. 3) so ends 248 (FIG. 18) of mounting member 180 abut a flange 156 (FIG. 4) of the other half-shell casing to hold mounting member 180 circumferentially. In other examples, mounting members 180 may be welded in place, pegged or otherwise fastened in place, etc. Lastly, complementary cross-sections allow circumferential insertion of mounting member 180, body 210 and/or arcuate portion(s) 212 thereof into at least partially circumferentially extending slot 182. For example, as shown in FIG. 4, where first or second portion 142, 146, respectively, are exposed, an end of slot 182 is open, e.g., at a flange 156 of casing body 144, such that mounting member 180, body 210 and/or arcuate portion(s) 212 thereof can be slid into place therein.

In FIG. 18, body 210 has a cross-section that is generally rectangular (excepting where passage 240 exists) with axial extensions 250, i.e., with extensions extending axially therefrom. Similarly, at least partially circumferentially extending slot 182 has a complementary cross-section that is rectangular with axial seats 252 configured to retain axial extensions 250 of body 210. Axial extensions 250 and axial seats 252 are referred to as axial because they extend axially. It is noted that while extension/seat pairs are shown in a directly opposing arrangement relative to sides of body 210, they do not have to be arranged in that manner. That is, the extension/seat pair on one side of body 210 can be in a radially different location than the extension/seat pair on the other side of body 210—see e.g., FIG. 2. Slot 182 axially retains body 210 of mounting member 180 by interacting with axially facing sides 254 of body 210. Extensions 250 and seats 252 are configured to radially fix mounting member 180 relative to circumferential interior surface 152 and make circumferential interior surface 152 of casing 122 and radially inner surface 222 of body 212 substantially coplanar. In FIG. 18, axial extensions 250 and axial seats 252 have complementary polygonal cross-sections. In the cross-sectional view of FIG. 19, body 210 has axial extensions 250 and slot 182 has axial seats 252, that have complementary rounded (e.g., hemispherical) cross-sections. (Note, variations of the FIG. 18 embodiment are also shown in FIGS. 2, 11-13 and 17).

FIG. 20-23 show cross-sections of a variety of alternative embodiments of complementary cross-sections of slot 182 and body 210. The various embodiments provide similar function as that of FIGS. 18 and 19. FIG. 20 shows an arrangement in which body 210 has a T-shaped cross-section 260, and at least partially circumferentially extending slot 182 has a complementary T-shaped cross-section 262 configured to receive the T-shaped cross-section of the body. (Note, FIG. 20 shows the T-shaped cross-sections inverted due to the location of the cross-section). Here, the top of the T-shape is internal to body 210, preventing radial removal of body 210. FIG. 21 shows an arrangement in which body 210 has a T-shaped cross-section extension 264, and at least partially circumferentially extending slot 182 has a complementary T-shaped cross-section extension 266 configured to receive the T-shaped cross-section extension of the body. FIG. 22 shows an arrangement in which body 210 has a dovetail cross-section 268, and at least partially circumferentially extending slot 182 has a complementary dovetail cross-section 270 configured to receive the dovetail cross-section of the body. The dovetail cross-sections are arranged to prevent radial removal of body 210. FIG. 23 shows an arrangement in which body 210 has an at least partially circular cross-section 272, and the at least partially circumferentially extending slot 182 has a complementary at least partially circular cross-section 274 configured to receive the at least partially circular cross-section of the body. The partially circular cross-sections are arranged to prevent radial removal of body 210.

FIGS. 24-26 show cross-sections of a variety of alternative embodiments of complementary cross-sections of slot 182 and body 210. In addition, a variety of additional mounting structures that can be used as illustrated, or with any of the embodiments described herein, are also shown. FIGS. 24 and 25 show a cross-section in which body 210 and slot 182 are rectangular. In addition, FIGS. 24 and 25 show a threaded fastener 258 coupling mounting member 180 to circumferential interior surface 152, and in particular, slot 182. In FIG. 24, threaded fastener 258 extends from radially inner surface 222 of body 210 of mounting member into casing 122, within slot 182. In FIG. 25, threaded fastener 258 extends from exterior surface 154 of casing 122, into slot 182 and into body 210 of mounting member. FIG. 25 necessitates an additional exterior opening(s) in casing 122. Any number of threaded fasteners 258 may be employed per mounting member 180. While particular locations for threaded fasteners 258 are illustrated, they can be located in any location desired capable of fixing mounting member 180 to casing 122. Mounting member 180 can include any necessary structures to receive threaded fastener 258, e.g., bosses, threaded openings, etc. FIG. 8 shows a complementary rectangular cross-section without fasteners. FIG. 26 shows a cross-section in which body 210 and slot 182 are T-shaped with the top of the T-shape at radially inner surface 222 of body. Here, body 210 is held to slot 182 by, for example, welds 276. Welds could be applied to the FIG. 8 embodiment also.

Referring again to FIG. 2, certain spaces 162 of circumferential interior surface 152 may be non-parallel with axis A of turbomachine 100 (FIG. 1). For example, circumferential interior surface 152 may be angled at a non-parallel angle α relative to axis A to direct a working fluid, e.g., air or combustion gases, in a desired manner. While body 210 has been shown in most of the drawings as being generally rectangular in cross-section (except for passage 240 and extensions 250), as shown in FIG. 2, body 210 can also have a cross-section configured to ensure circumferential interior surface 152 of casing 122 and radially inner surface 222 of body 210 are substantially coplanar, even where circumferential interior surface 152 is not parallel with axis A and/or a bottom surface 264 of slot 182 is not parallel with circumferential interior surface 152. Here, radially inner surface 222 of body 210 of mounting member 180 may be angled to match that of circumferential interior surface 152. For example, radially inner surface 222 of body 210 may be non-parallel with radially outer surface 280 of body 210 of mounting member 180. Body 210 may thus have a non-uniform radial height (up/down page in FIG. 2).

Mounting member(s) 180 and exposed portions of sensor (s) 170 may be made out of any material capable of withstanding the environment of the component of turbomachine 100 (FIG. 1) in which employed. In one example, mounting members 180 and exposed portions of sensor(s) 170 may be made out of 410 stainless steel, or any of a variety of metals capable of use in turbomachine 100 (FIG. 1) and usable in an additive manufacturing setting such as but not limited to direct metal laser melting (DMLM). The materials used may be selected to match the coefficient of thermal expansion (CTE) of the material of circumferential interior surface 152 and casing body 144, e.g., to keep mounting member(s) 180 from expanding at a different rate: contracting causing a gap to open or expanding causing it to buckle.

C. Additional Sensor Systems

A number of sensor systems 160 may be employed in a single casing 122, according to embodiments of the disclosure. A casing 122 for turbomachine 100 (FIG. 1) may thus include casing body 144 including circumferential interior surface 152 and exterior surface 154, and a sensor system 160, as described herein. Casing 122 can also include at least one additional sensor system 160, as described herein, see e.g., FIG. 5, in which a set of three sensor systems 160 is used in one space 162, and two sets of 2 sensor systems 160 are employed in another space 162. Each additional sensor system 160 may be mounted in any manner described herein. For example, each additional sensor system 160 may include a mounting member 180, as described herein, in a respective at least partially circumferentially extending slot 182 in space 162 in circumferential interior surface 152 between mounts 164 for pair of stages 120 (FIG. 2) of nozzles 126 (FIG. 2). Slots 182 for each system may be axially distanced from one another.

Referring to FIGS. 2 and 5, each sensor system 160 may include a different set of sensors 170 coupled relative to circumferential interior surface 152 of casing body 144, i.e., in space 162 between mounts 164 for pair of stages 120 (FIG. 2) of nozzles. Accordingly, sensor(s) 170 in one sensor system 160 may be provided in addition to sensor(s) 170 in another sensor system 160. Sensor(s) 170 in one sensor system 160 may being axially distant from sensor(s) 170 in another sensor system 160, i.e., they are spaced relative to axis A of turbomachine 100 (FIG. 1). Again, sensor(s) 170 extend at most only partially through casing body 144. Sensor(s) 170 may be coupled relative to interior surface 152 in any manner described herein relative to FIGS. 6-8. In one example, shown in FIGS. 2 and 5, each sensor system 160 may include its own mounting member 180. As described, each mounting member(s) 180 includes sensor(s) 170 mounted therein. Each mounting member(s) 180 is configured to be mounted relative to interior surface 152 of casing body 144 in space 162 between mounts 164 for pair of stages 120 (FIG. 2) of nozzles. Here, a number of at least partially circumferentially extending slots 182 is provided in space 162. Each slot 182 is axially distanced from an adjacent slot 182 in interior surface 152 between mounts 164. That is, each mounting member 180 may be positioned in a respective slot 182 such that sensor(s) 170 therein are axially distanced from sensor(s) 170 of an adjacent mounting member 180, positioned in another slot 182. Hence, sensors 170 can provide measurements at different axial locations within turbomachine 100 (FIG. 1). For example, sensors 170 may provide rotating blade 132 (FIG. 2) arrival time for fore and aft portions of rotating blades.

D. Communication Leads and Routing Thereof

As shown in FIGS. 6-8 and 16, each sensor 170 may include a communications lead 174 operatively coupled thereto for electrical or optical communication of its measurements, depending on type of sensor, to a data acquisition system (not shown) outside of casing body 144. Alternatively, a number of sensors 170 may share a communications lead 174. Communications lead 174 may include any signal communicating wire format, e.g., a fiber optic filament, metal or metal alloy wire (e.g., silver-plated copper wiring), etc., capable of carrying a signal. In contrast to conventional sensor systems, a method according to embodiments of the disclosure includes routing communications lead(s) 174 operatively coupled to sensor(s) 170 to extend circumferentially along interior surface 152 of casing body 144. Hence, communications lead(s) 174 of sensor system 160 extend circumferentially along interior surface 152 of casing body 144. Sensor(s) 170 and communications lead(s) 174 may be positioned in space 162 between mounts 154 for a pair of stages 120 (FIG. 2) of nozzles in interior surface 152 of casing body 144.

Referring to FIG. 9, in contrast to conventional radially mounted sensors, communications leads 174 of sensors 170 may be routed to exit casing body 144 at a single exit opening 186. Communication leads 174 may also exit casing body 144 at a number of additional exit openings (not shown), but the number of exit openings is not one-to-one with the number of sensors 170, and so the number of exit openings 186 can be drastically reduced as compared to the same number of conventional radially inserted sensors. That is, the number of exit openings in casing body 144 is reduced, and the number of communications leads 174 requiring routing on exterior surface 154 is simplified. Removal of equipment on exterior surface 154 of casing 122 is avoided.

A method according to embodiments of the disclosure may include routing communication lead(s) 174 relative to interior surface 152 of first portion 142 (FIGS. 3-5) of casing body 144. That is, communication lead(s) 174 may be routed on first portion 142 alone. In addition, or as an alternative, the method may include routing communication lead(s) 174 relative to interior surface 152 of second portion 146 (FIG. 3) of casing body 144, i.e., after removal of rotor 112 (FIG. 3). In any event, communication lead(s) 174 extend circumferentially along interior surface 152 of casing body 144, and not radially through or outwardly from casing body 144.

E. Sensor Arrangements

As shown in FIGS. 4-8, sensor(s) 170 may include a plurality of each sensor 170 coupled relative to interior surface 152 of casing body 144 in space 162 between mounts 164 for pair of stages 120 (FIG. 2) of nozzles. Sensors 170 may be positioned anywhere necessary along circumferential interior surface 152. For example, they may be positioned in a distributed manner (FIG. 4) (e.g., circumferentially spaced, circumferentially equidistant, etc.), or as shown in the cross-sectional view of FIG. 9, in clusters at discrete circumferential extents of casing body 144. As shown in the partial perspective view of FIG. 10, sensors 170 may be axially spaced within a given circumferential mounting arrangement. In the example shown in FIG. 10, a number of sensors 170 are axially spaced within a single mounting member 180. In FIG. 15, sensors 170 may be singular and circumferentially spaced, and other sensors (to be located in openings 220B) would be axially spaced and circumferentially spaced. Sensors 170 can also be axially spaced in any of the mounting scenarios shown in FIGS. 6 and 7. In this manner and in contrast to radially positioned sensors, any number of sensors 170 can be provided, of various types and they can be spaced in close proximity without concern for mechanical integrity of casing body 144. In one example, sensors 170 that measure blade timing for rotating blade 132 (FIG. 2) leading and trailing edges and mid-core can be provided. Blade timing measurements of this type can typically be accomplished with conventional radially mounted sensors in different circumferential locations, requiring at least three openings in the casing and reducing the mechanical integrity of casing 122.

Mounting members 180 may also include rake members (not shown) extending radially inward therefrom, where it is possible to provide them, e.g., at an axial end region of the casing. In this manner, sensors 170 can be positioned in any manner circumferentially, axially and radially.

F. Sensor Types

Sensors 170 may measure any now known or later developed operational parameter of turbomachine 100, including but not limited to: time of arrival for blade tip timing, blade tip clearance (post-outage), dynamic pressure, static pressure, rotating vibration, flow vibration, stall detection (e.g., using a compressor active stability management (CASM) sensor), rotor speed, optical rotor vibration, and temperature. Sensors 170 may take any now known or later developed form appropriate for measuring the operational parameters, e.g., optical, infrared, radio frequency, inductive, capacitive, etc. Where more than one sensor is provided, sensors 170 may measure the same operational parameter of turbomachine 100 (FIG. 1), e.g., rotational blade proximity, or sensors 170 may measure different operational parameters of turbomachine 100 (FIG. 1), e.g., temperature and dynamic pressure.

Referring to FIGS. 27-33, another embodiment of the disclosure may provide an optical sensor 300 for a rotating blade stage 120 (FIG. 2) of turbomachine 100 (FIG. 1). As described, optical sensor 300 is configured for use coupled relative to circumferential interior surface 152 of casing 122, rather than as a conventional radially extending sensor. FIG. 27 shows a perspective view of an optical sensor 300 in a mounting member 180, FIG. 28 shows an exploded perspective view of optical sensor 300 and mounting member 180, and FIG. 29 shows a perspective view of optical sensor 300 mounted in casing 122 with rotating blades 132. FIGS. 30-32 show schematic cross-sections of optical sensor 300 according to a number of embodiments.

Embodiments of optical sensor 300 may include a housing 310 configured to be mounted relative to circumferential interior surface 152 of casing 122 of turbomachine 100 (FIG. 1). Housing 310 may include a sender opening 312 and a receiver opening 314, or a combined sender/receiver opening 315. Housing 310 may be mounted relative to circumferential interior surface 152 according to any embodiment described herein. FIGS. 27-30 show housing 310 as a mounting member 180, as described herein; FIG. 31 shows housing 310 mounted with use of an adhesive element 172, as in FIG. 6; and FIG. 32 shows housing 310 mounted in an at least partially embedded manner in a slot 176 in casing 122, as in FIG. 7. In terms of mounting member 180, optical sensor 300 can be mounted as described for sensors 170 in FIGS. 15 and 16.

Optical sensor 300 may also include at least one optical fiber 320 operatively coupled to housing 210 for communicating: an optical signal 322 for sending toward (e.g., transmitting toward) rotating blade stage 120 (FIG. 29), i.e., rotating blades 132 thereof, and a return optical signal 324 reflected by rotating blade stage 120, through casing 122. Optical signal 322 may be sent through sender opening 312 or sender/receiver opening 315 (FIG. 31), and return optical signal 324 may be received through receiver opening 314 or sender/receiver opening 315 (FIG. 31). Openings 312, 314 may be provided, as shown in FIGS. 27-29, in housing 310 of optical sensor 300. Alternatively, openings 312, 314 may be provided, as shown in FIG. 15, in mounting member 180 as openings 220B. Similarly, sender/receiver opening 315 (FIG. 31) may be provided, as shown in FIGS. 27-29 for openings 312, 314, or in mounting member 180 as a single opening 220B. In any event, optical fiber(s) 320 act as communications lead 174, as described herein, and have a longitudinal shape, i.e., lengthwise shape, configured to follow circumferential interior surface 152 of casing 122. That is, optical fiber(s) 320 have a radial height sufficiently short to allow their routing circumferentially along circumferential interior surface 152. In one embodiment, shown in FIGS. 30 and 32, optical fiber 320 includes a single optical fiber. In this case, optical fiber 320 is configured to allow two way optical communications. In another embodiment, an example of which is shown in FIG. 31, optical fiber 320 includes more than one optical fiber, e.g., a send optical fiber 320A for optical signal 322, and a receive optical fiber 320B for return optical signal 324.

Optical sensor 300 may include an optical signal redirecting element 330 configured to redirect optical signal 322 from optical fiber(s) 320 inwardly toward rotating blade stage 120 relative to casing 122, and redirect return optical signal 324 reflected by rotating blade stage 120 into optical fiber(s) 320. In one embodiment, as shown in FIGS. 30-32, optical signal redirecting element 330 redirects optical signal 322 from optical fiber(s) 320 inwardly at a substantially perpendicular angle relative to an axis A (into and out of page) of turbomachine 100 (FIG. 1) and a substantially radially (up/down page) relative to circumferential interior surface 152 of casing 122 toward rotating blade stage 120. Optical signal 322 may pass through sender opening 312 or sender/receiver opening 315 (FIG. 31). Optical signal redirecting element 330 also redirects return optical signal 324 reflected by rotating blade stage 120 into optical fiber(s) 320 extending along circumferential interior surface 152 of casing 122. Return optical signal 324 may return through receiver opening 314 or sender/receiver opening 315 (FIG. 31). Where optical fiber 320 includes more than one optical fiber 320, as shown in FIG. 31, signal redirecting element 330 is operatively coupled to send optical fiber 320A and receive optical fiber 320B.

Referring to FIGS. 30-32, signal redirecting element 330 may take a variety of forms. In one embodiment, shown in FIG. 30, signal redirecting element 330 may include a cleaved end 332 of optical fiber(s) 320. Cleaved end 332 may be angled in any necessary manner to direct optical signals 322, 324, as described. In another embodiment, shown in FIG. 31, signal redirecting element 330 may include a prism 334. Prism 334 may be positioned and have a reflective angled surface 336 angled in any necessary manner to direct optical signals 322, 324, as described. In another embodiment, shown in FIG. 32, signal redirecting element 330 may include a mirror 338. Mirror 338 may be positioned and angled in any necessary manner to direct optical signals 322, 324, as described. While particular embodiments of signal redirecting element 330 have been described, it may alternatively include any other now known or later developed optical signal redirecting mechanism capable of directing optical signals 322, 324, as described.

Figure 33:
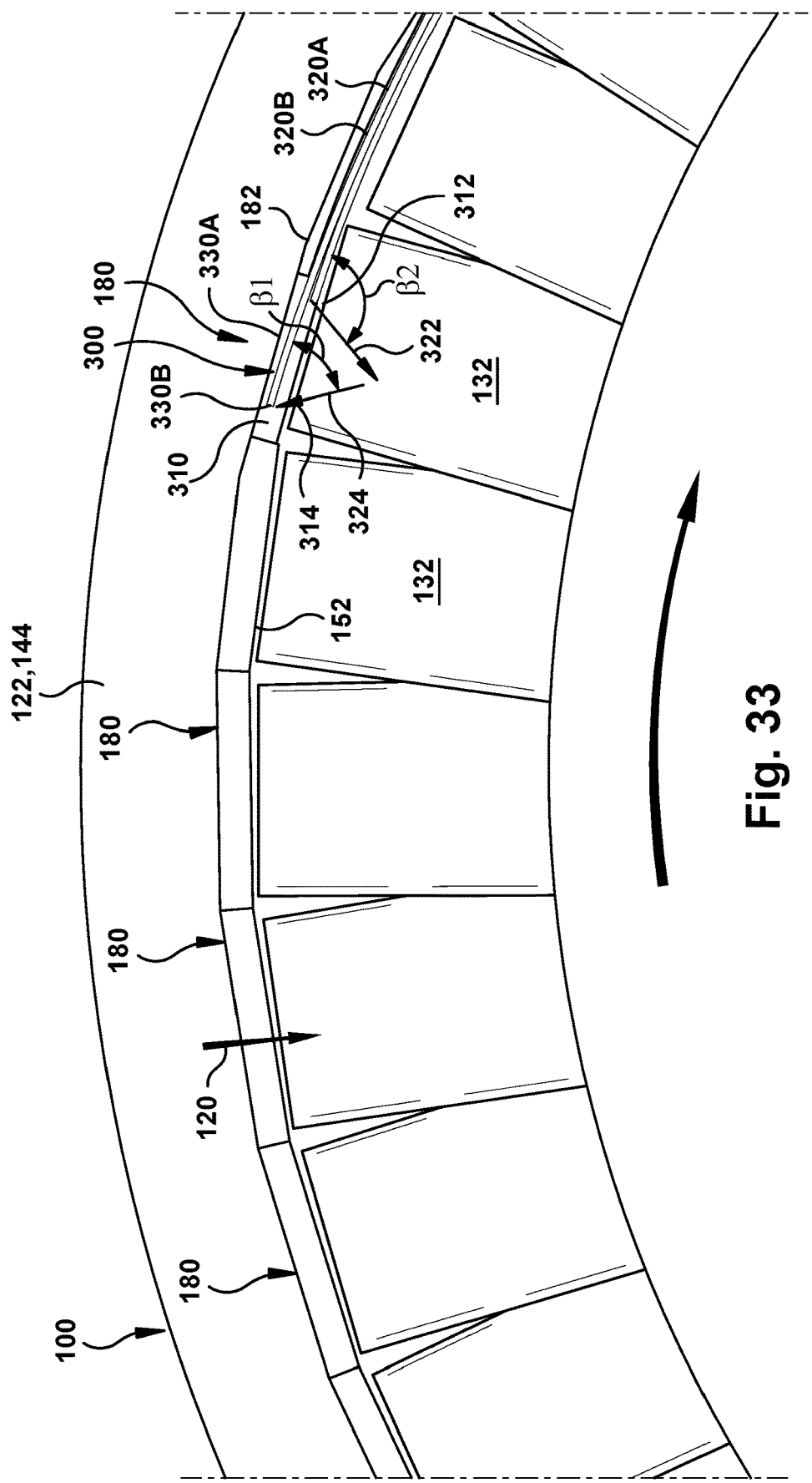
FIG. 33 shows a cross-sectional view of an optical sensor, according to another embodiment of the disclosure.

FIG. 33 shows a schematic cross-sectional view of a portion of turbomachine 100 including an optical sensor 300 according to an alternative embodiment. In this embodiment, two optical fibers are provided, i.e., a send optical fiber 320A and a receive optical fiber 320B. Further, two optical signal redirecting elements 330 are provided: a first optical signal redirecting element 330A for optical signal 322 and a second optical redirecting element 330B for return optical signal 324. As illustrated, first optical signal redirecting element 330A is distanced circumferentially from second optical signal redirecting element 330B along circumferential interior surface 152 of casing 122. First optical signal redirecting element 330A redirects optical signal 322 from optical fiber(s) 320A inwardly at a first non-perpendicular angle (31 relative to circumferential interior surface 152 of casing 122 toward rotating blade stage 120. Second optical signal redirecting element 330B redirects return optical signal 324 reflected by rotating blade stage 120 received at a second non-perpendicular angle β2 relative to circumferential interior surface 152 of casing 122 into optical fiber(s) 320B extending along circumferential interior surface 152 of casing 122. As observed in FIG. 33, first and second non-perpendicular angles β1 and β2 are different. In one example, angle β1 may be approximately 105°, and angle β2 may be approximately 75°. Optical fibers 320A, 320B may be appropriately cleaved at approximately 37.5° and 142.5°. Optical sensor 300 according to this embodiment can thus create non-perpendicular optical signal send and receive angles that are not possible with conventional radially-disposed sensors. Optical sensor 300 according to this embodiment can allow for clearance testing using a conventional time of arrival function for the clearance, as described in, for example, U.S. Pat. No. 4,049,349.

Optical sensor 300 has a very low radial profile, e.g., housing 310 and optical fiber(s) 320, regardless of how mounted, and may have a radial height of no greater than two centimeters. Optical sensor 300 also allows many optical fibers 320 to be routed to the same location, allowing for better signal-to-noise ratio, higher data density, and redundancy.

Optical sensor 300 allows for a method of performing an optical analysis of a rotating blade stage 120 of turbomachine 100 that includes mounting optical sensor 300, as described herein, to circumferential interior surface 152 of casing 122 of turbomachine 100, and performing the optical analysis of rotating blade stage 120 using the optical sensor. The optical analysis may include any now known or later developed analysis such as but not limited to: a clearance test for rotating blade stage 120 relative to the circumferential interior surface 152 of casing 122, and/or a time-of-arrival testing for rotating blade stage 120 (testing blade vibration and frequency in a non-contact manner).

While individual optical sensors 300 are shown, it is understood that any number of optical sensors 300 can be provided, as described herein relative to sensors 170. The optics used can vary depending on application, and may include, for example, light or laser.

G. Use of Sensor Systems

Sensor systems 160 according to embodiments of the disclosure may be used for post-outage testing of a turbomachine 100 (FIG. 1), prior to re-start and power generation. To this end, once sensor(s) 170 are coupled and communication leads(s) 174 are routed, a method according to embodiments of the disclosure may include re-assembling first portion 142 to second portion 146 of casing 122, e.g., where portions are half-shells, half-shell casing 148 to half-shell casing 150. Re-assembly may take any now known or later developed form such as lifting first portion 142 and lowering into place relative to second portion 146, re-bolting them together and replacing any ancillary casing 122 equipment that may have been removed (e.g., pipes, insulation, flanges, lifting lugs, other instrumentation, bolts, or any other physical object in close proximity to the casing). Where rotor 112 is removed, it may be replaced in second portion 146 prior to the re-assembly. Turbomachine 100 (FIG. 1) may then be activated in any now known or later developed fashion for post-outage calibration, trials and testing. In this regard, a method according to embodiments of the disclosure may include measuring an operational parameter of turbomachine 100 (FIG. 1) using sensor(s) 170 during a post-outage testing operation of turbomachine 100 (FIG. 1). The post-outage testing may include using any measurements obtained by sensor(s) 170. For example, time of arrival for blade tip timing, blade tip clearance, dynamic pressure, static pressure, rotating vibration, stall detection (e.g., a compressor active stability management (CASM) sensor), rotor speed, optical rotor vibration, and temperature. In contrast to conventional radially positioned post-outage sensors, embodiments of the disclosure allow operating of turbomachine 100 (FIG. 1) with sensor(s) 170 remaining in the turbomachine after the post-outage testing operation. That is, sensor(s) 170 do not need to be removed prior to operation. In addition, sensor(s) 170 may remain operational, allowing for continued measurements during operation of turbomachine 100 (FIG. 1).

H. Other Applications of Mounting on Circumferential Interior Surface of Casing

The teachings of the disclosure can also be applied to other applications that benefit from mounting of structures to circumferential interior surface of casing 122. In one alternative embodiment, a wireless sensor antenna system 400 for turbomachine 100 (FIG. 1) including a rotating blade 132 including a passive sensor 402 thereon is provided. Small passive sensors 402 may be coupled to rotating blade(s) 132 to measure, for example, temperature, stress, strain or other physical attribute(s) of the material of the rotating blade to which attached. Sensors 402 may include any now known or later developed passive sensor that can be remotely powered, e.g., via an induction, capacitance, optical or radio frequency signal. Typically, such sensors 402 would have to be powered by circumferentially spaced power transmission elements, e.g., coils, and antennae, over a radial air gap between the rotating passive sensors and the stationary antennae/power coil. These sensors provide multiple, intermittent measurements as rotating blade 132 rotates, i.e., once per revolution, past a power providing and sensing location, but create only a near-static measurement. In order to obtain viable data on quickly changing physical properties (e.g., strain) measurements must be completed at a very high frequency, e.g., 300 MHz, which cannot be achieved on a per revolution basis. Further, the current passive sensors must be very close to the antenna that receive data from the sensors in order for them to work property, which can be very challenging on a turbomachine. In contrast, a wireless sensor antenna system 400 according to embodiments to the disclosure provides an antenna and power transmission element that extend along at least a portion of the circumferential interior surface 152, providing continuous (non-intermittent) measurements and real-time data about (possibly) quickly changing operational parameters.

Wireless sensor antenna system 400 includes an antenna 410 extending continuously along a circumferential interior surface 152 of casing 122 of turbomachine 100 that surrounds rotating blade 132. Antenna 410 may be configured to receive a wireless signal 412, which includes data indicative of the physical property of rotating blade 132 being measured by passive sensor 402. Antenna 410 may also transmit a wireless signal 414 to communicate with passive sensor 402, if desired. Antenna 410 may include any form of data transmission antenna element such as but not limited to: electrical coils (inductive coupling), capacitors (capacitive coupling), magnetic coupling, or optical.

Wireless sensor antenna system 400 may also include a power transmission element 420 extending along at least portion of circumferential interior surface 152 of casing 122 to power passive sensor 402. Power transmission element 420 may include any form of power transmission line or wire, e.g., a wire or an elongated sinusoidal or coiled wire, capable of electromagnetically powering passive sensor 402 through, for example, an inductance, capacitive, optical or radio frequency signal.

In one embodiment, antenna 410 and power transmission element 420 may extend along an entirety of circumferential interior surface 152 of casing 122 of turbomachine 100 (FIG. 1) that surrounds stage 120 of rotating blades 132. Here, passive sensor 402 can be continuously activated to provide data. In other embodiments, only a desired portion of circumferential interior surface 152 may be used. Antenna 410 and power transmission element 420 may extend through exit opening 186 (FIG. 9) in casing 122. Only one exit opening 186 (FIG. 9) may be required.

Figure 34:
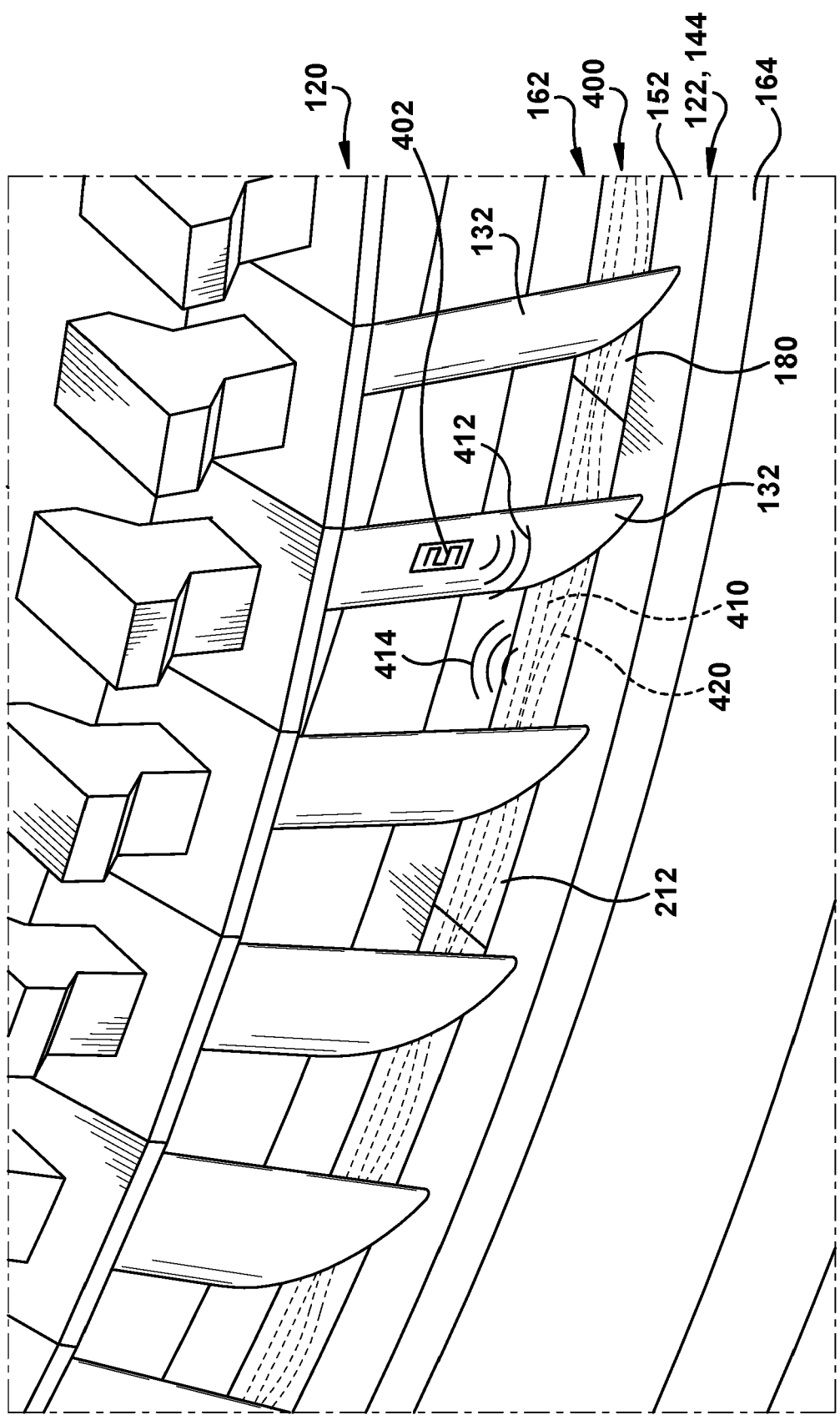
FIG. 34 shows a perspective view of a wireless antenna system, according to an embodiment of the disclosure.

Antenna 410 and power transmission element 420 may be mounted to circumferential interior surface 152 in any manner described herein. For example, they may be adhered to the surface as in FIG. 6, or partially embedded as in FIG. 7. In the example of FIG. 34, antenna 410 and power transmission element 420 are mounted in mounting member 180 positioned in slot 182 that extends at least partially circumferentially in circumferential interior surface 142 of at least a portion of casing 122. Antenna 410 and power transmission element 420 may be mounted in mounting member 180, e.g., in a passage 240 (FIG. 18) therein. For example, they may be wires that extend in passage 240 (FIG. 18) similar to communications leads 174 (FIG. 17), or they may be printed wiring that is printed onto an interior surface of passage 240. As described herein, mounting member 180 may include an arcuate portion 212 configured to mount in at least partially circumferentially extending slot 182.

In operation according to a method of operation for wireless sensor antenna system 400, antenna 410 and power transmission element 420 may be mounted, i.e., in any manner as described herein, along at least a portion of a circumferential interior surface 152 of casing 122. Power transmission element 420 may power passive sensor 402. A physical property of rotating blade 132, e.g., strain, stress, etc., may be measured by powering passive sensor 402 with power transmission element 420 and receiving a wireless signal 412 from passive sensor 402 on rotating blade 132 at antenna 410. Wireless signal 412 may include data indicative of the physical property.

I. Mounting System for Tool to Form Slot on Circumferential Interior Surface of Casing Referring to FIGS. 35-44, embodiments of the disclosure may also include a mounting system 500 for a tool 502 for machining half-shell casing 148, 150 of turbomachine 100 (FIG. 1), and in particular, circumferential interior surface 152 of half-shell casing 148, 150. In one illustrative application, mounting system 500 may mount tool 502 to form at least partially circumferentially extending slot 182 on circumferential interior surface 152 of casing 122 of turbomachine 100 (FIG. 1), i.e., for use with mounting member 180. Formation of an at least partially circumferentially extending slot 182 can be challenging. For example, casing portion 142, 146 in the form of a half-shell casing 148, 150 can be out-of-round when removed from, or exposed in, turbomachine 100 (FIG. 1). For example, it can be warped, pinched, sprung from its intended hemispherical shape. Consequently, forming a slot in circumferential interior surface 152 at a uniform depth can be very difficult. In addition, slot 182 must be formed in a uniform manner relative to mounts 164 for a pair of stages 120 (FIG. 2) of nozzles 126 (FIG. 2) in circumferential interior surface 152 of casing 122, e.g., slot 182 may need to be equidistant from each mount 164. Manually guiding a tool to create slot 182 that has uniform depth and consistent axial spacing relative to mounts 164 can be very difficult. While the teachings of the disclosure will be described mainly relative to forming slot 182, it will understood that mounting system 500 may be employed to machine other features in half-shell casings 148, 150, e.g., radially extending holes and/or other features. Tool 502 may be powered in any known fashion, e.g., via an electric motor, hydraulics, pneumatics, etc., and may include any ancillary transmission structures (not shown) necessary to transmit power to a working element thereof, e.g., a machining element.

Figure 35:
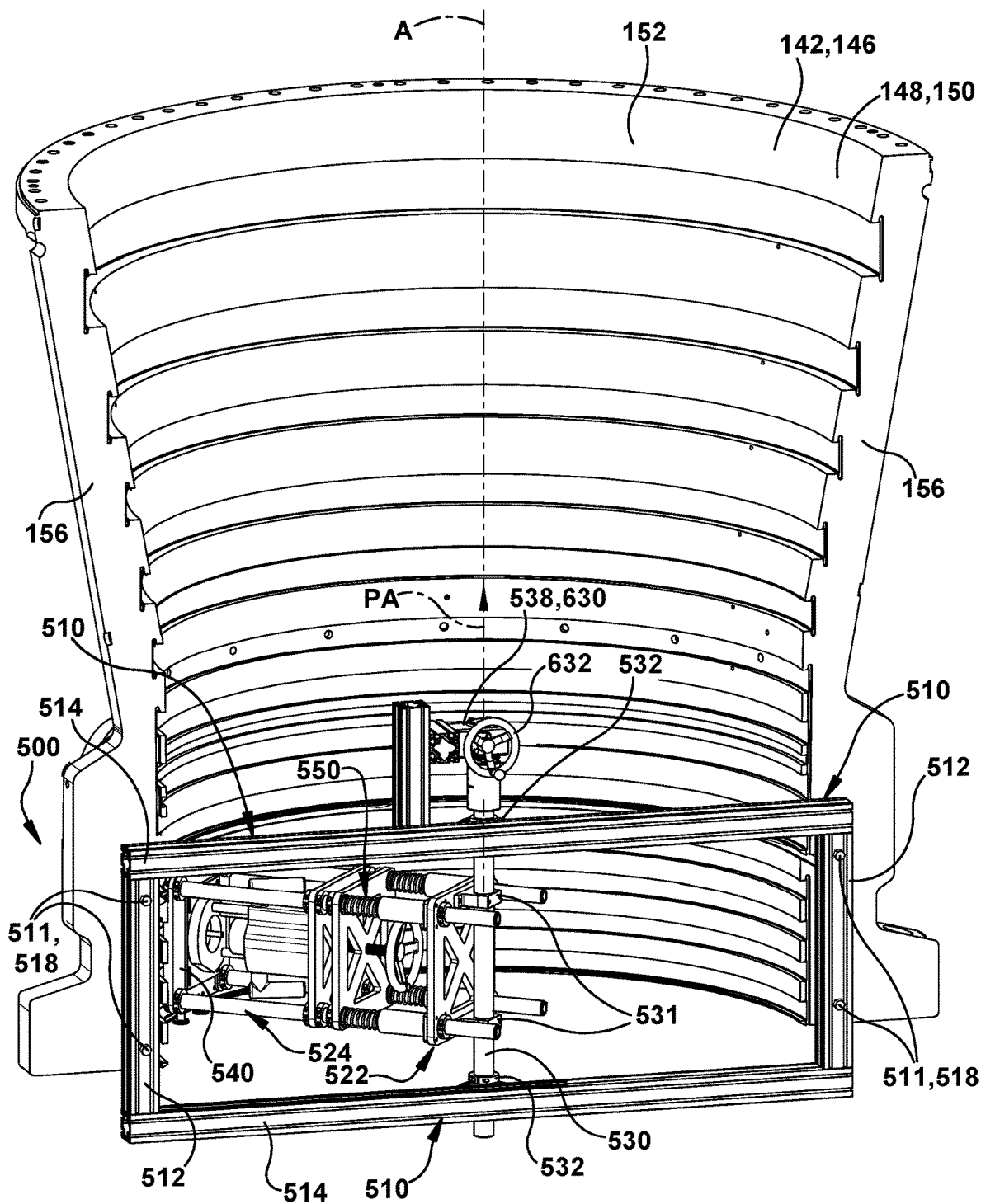
FIG. 35 shows a perspective view of a mounting system for a tool for machining a half-shell casing, according to an embodiment of the disclosure.
Figure 36:
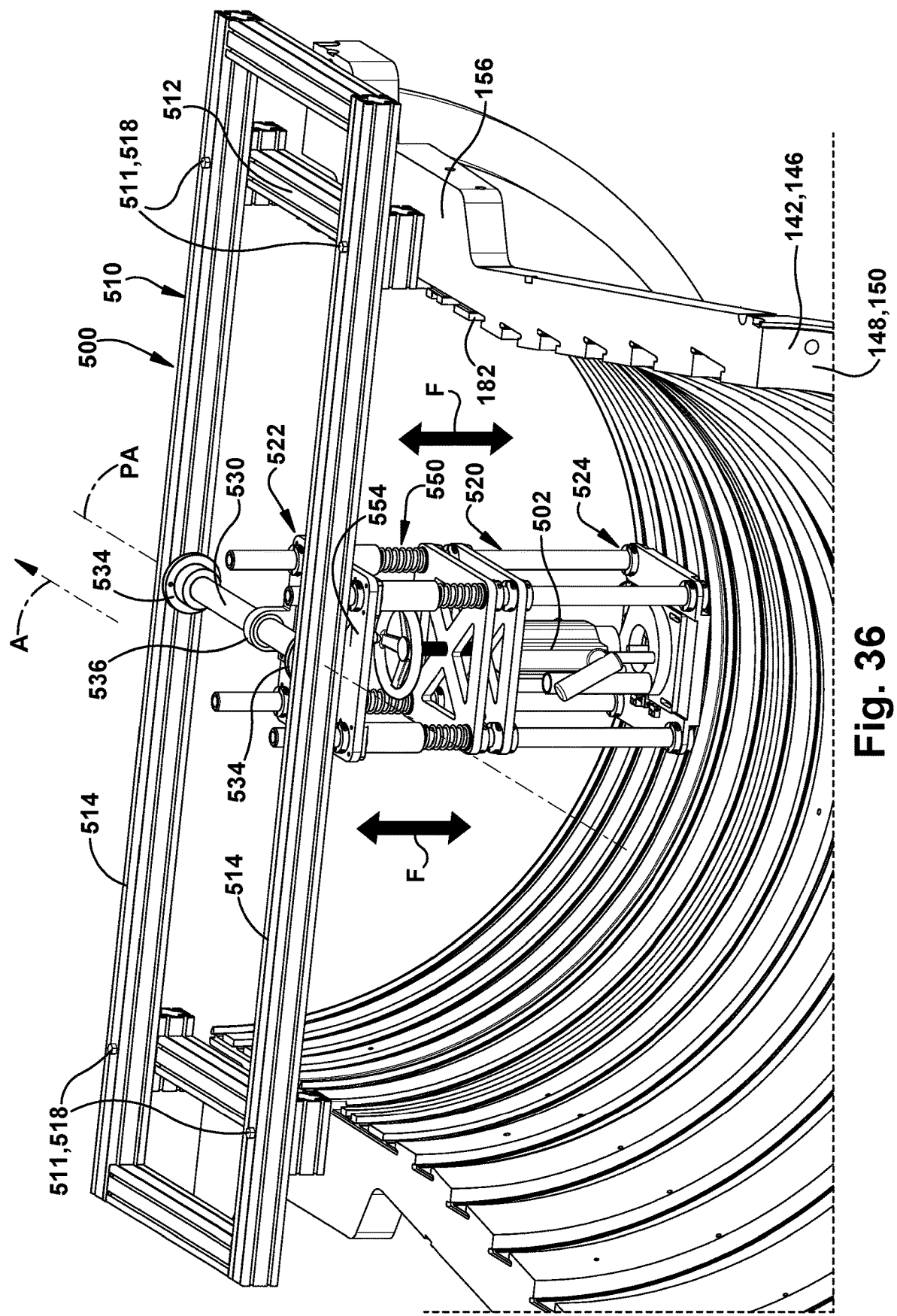
FIG. 36 shows a perspective view of a mounting system for a tool for machining a half-shell casing, according to another embodiment of the disclosure.
Figure 37:
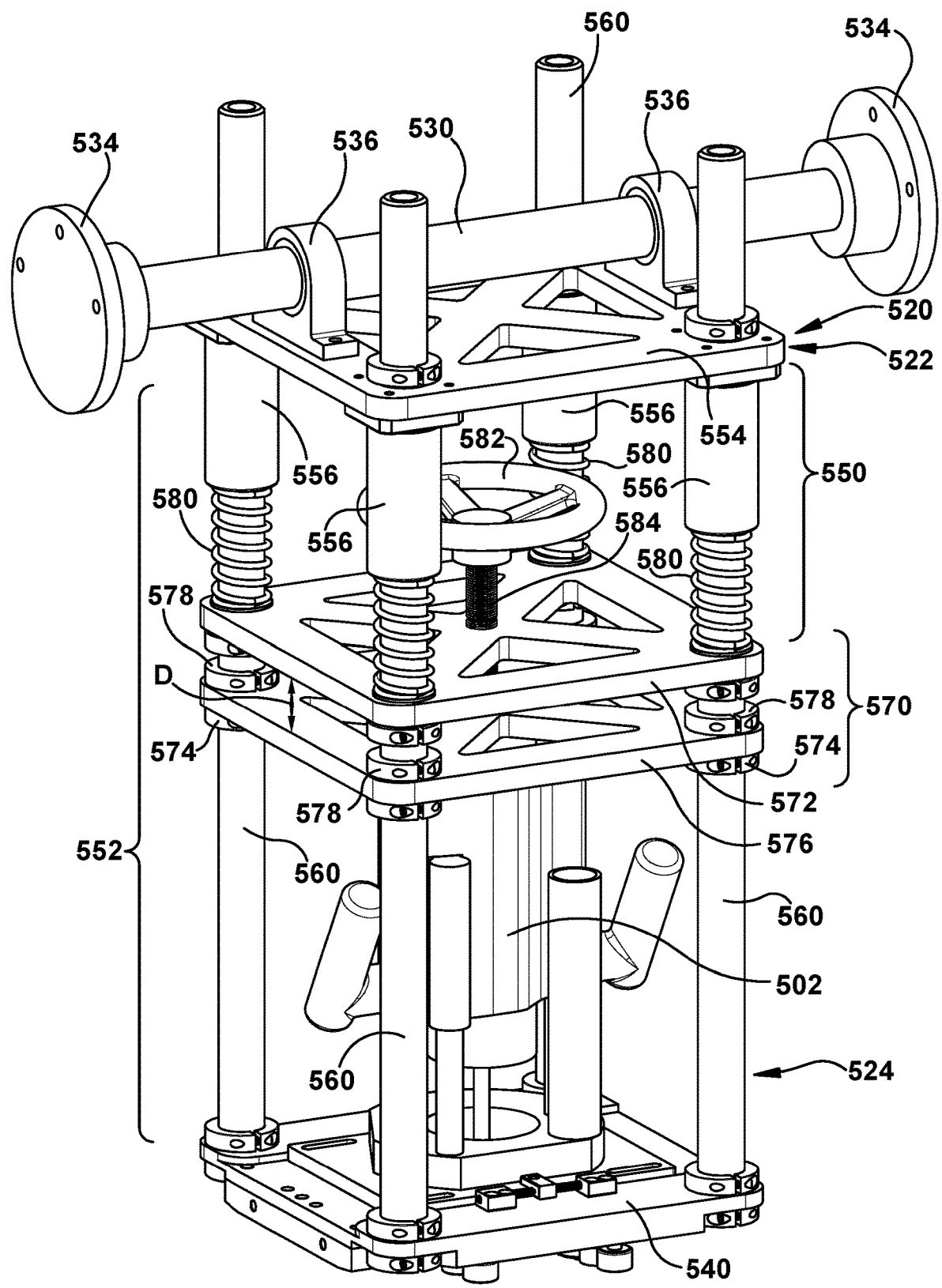
FIG. 37 shows an enlarged perspective view of a tool mount of the mounting system of FIG. 36, according to an embodiment of the disclosure.

FIGS. 35 and 36 show perspective views of mounting system 500 coupled to a half-shell casing 148, 150 of a turbomachine. FIG. 35 shows half-shell casing 148, 150 standing vertically, e.g., on a floor in a manufacturing setting or, advantageously, on a floor at a power plant where the half-shell casing 148, 150 is used in a turbomachine (FIG. 1). In FIG. 35, half-shell casing 148, 150 has been removed from turbomachine 100 (FIG. 1). FIG. 36 shows half-shell casing 148, 150 in a generally horizontal position, e.g., a lower half-shell casing 150 remaining in position in turbomachine 100 (FIG. 1) after removal of upper half-shell casing 148, or either half-shell casing 148, 150 set on a floor, open upwardly. It is noted that mounting system 500 can be employed regardless of how half-shell casing 148, 150 is physically situated. FIG. 37 shows a detailed perspective view of tool mount 520 according to the FIG. 36 embodiment.

As shown in FIGS. 35 and 36, mounting system 500 may include a base frame 510 including a mounting element 511 configured to fixedly mount base frame 510 to half-shell casing 148, 150. Base frame 510 may include any form of mechanical frame having sufficient strength and rigidity to resist forces applied thereto by tool 502 and a tool mount 520, described herein. In the example shown in FIGS. 35 and 36, base frame 510 may include a first pair of opposing rails 512 coupled to a second pair of opposing rails 514, creating a box frame. However, base frame 510 can have a wide variety of alternative shapes and frame parts. Rails 512, 514 may be coupled in any desired manner, e.g., welding, mechanical fasteners, integral formation, etc. Base frame 510 spans at least a portion of half-shell casing 148, 150, i.e., it extends at least a portion across from one side of half-shell casing to the other side. In the example shown, base frame 510 spans an entirety of half-shell casing 148, 150, but that may not be necessary in all instances, i.e., base frame 510 could be cantilevered over circumferential interior surface 152. Base frame 510 may be coupled to half-shell casings 148, 150 by mounting element 511. Mounting element 511 can take variety of forms such as but not limited to clamps or other mechanical fasteners 518 for coupling base frame 510 to flanges 156 of half-shell casings 148, 150.

Mounting system 500 also includes a tool mount 520 including a first end 522 pivotally coupled to base frame 510 to pivot about a pivot axis PA that is substantially parallel (i.e., on-axis with rotor centerline or with some tolerance from being off-center (e.g., within))+/−3°)) relative to an axis A of half-shell casing 148, 150, and a second end 524 configured to couple to and position tool 502 for machining half-shell casing 148, 150. Tool mount 520 may be pivotally coupled to base frame 510 in a number of ways. As shown in FIG. 35, tool mount 520, e.g., a base member 554 thereof, may be fixedly coupled to a pivot member 530, and pivot member 530 may rotate relative to base frame 510. In FIG. 35, pivot member 530 may be rotatably coupled to base frame 510 by a pair of bearings 532 fixedly couple to base frame 510, e.g., opposing rails 514. Pivot member 530 includes mounts 531 that couple it to tool mount 520. In this case, a transmission 538 may be coupled to pivot member 530 to rotate it and tool mount 520, as will be described herein. In an alternative embodiment, as shown in FIGS. 36 and 37, tool mount 520 may be rotatably coupled to pivot member 530 to rotate about pivot member 530, and pivot member 530 may be fixedly coupled to base frame 510. Here, pivot member 530 includes a pair of fixed mounts 534 that fixedly couple to base frame 510, e.g., rails 512, and a pair of bearings 536 are coupled to tool mount 520, e.g., a base member 554 thereof, that can receive pivot member 530 therein to allow tool mount 520 to rotate about pivot member 530 and pivot relative to base frame 510. Here, tool mount 520 can be manually pushed to rotate about pivot member 530. In any event, as shown by arrows in FIGS. 35 and 36, tool mount 520 may rotate the entire extent of circumferential interior surface 152, e.g., 180°.

Pivot axis PA, as may be defined by pivot member 530, positions tool mount 520 that holds tool 502 at or near a center of half-shell casings 148, 150, i.e., at or near axis A. As will be further described, however, pivot axis PA does not necessarily have to be at an exact center of half-shell casing 148, 150, i.e., some tolerance from being off-center is allowed. The level of tolerance may vary depending on a number of factors such as but not limited to: attributes of the half-shell casings 148, 150 such as size, shape/out-of-roundness; or axial position of space 162 to be machined. Pivot axis PA and pivot member 530 may extend substantially parallel relative to an axis A of half-shell casing 148, 150. Pivot axis PA and pivot member 530 may be positionally adjustable in any of a variety of ways. In one embodiment, base frame 510 may be laterally adjustably positioned relative to half-shell casings 148, 150 (left-to-right as shown in FIGS. 35-36) by mounting element 511 so as to adjust a radial position of pivot axis PA and pivot member 530 relative to half-shell casings 148, 150. Alternatively, pivot axis PA and pivot member 530 may be laterally adjustable relative to base frame 510, e.g., by way of clamps or other mechanical fasteners (not shown). A longitudinal position of tool mount 520 relative to half shell casings 148, 150, i.e., position along axis A illustrated as vertical in FIG. 35 and horizontal in FIG. 36, may be based on a mounting position of base frame 510 relative to half-shell casing 148, 150. Alternatively, as will be described, a longitudinal adjust system (not shown) could also be employed to adjust a position of tool mount 520 relative to base frame 510.

Figure 38:
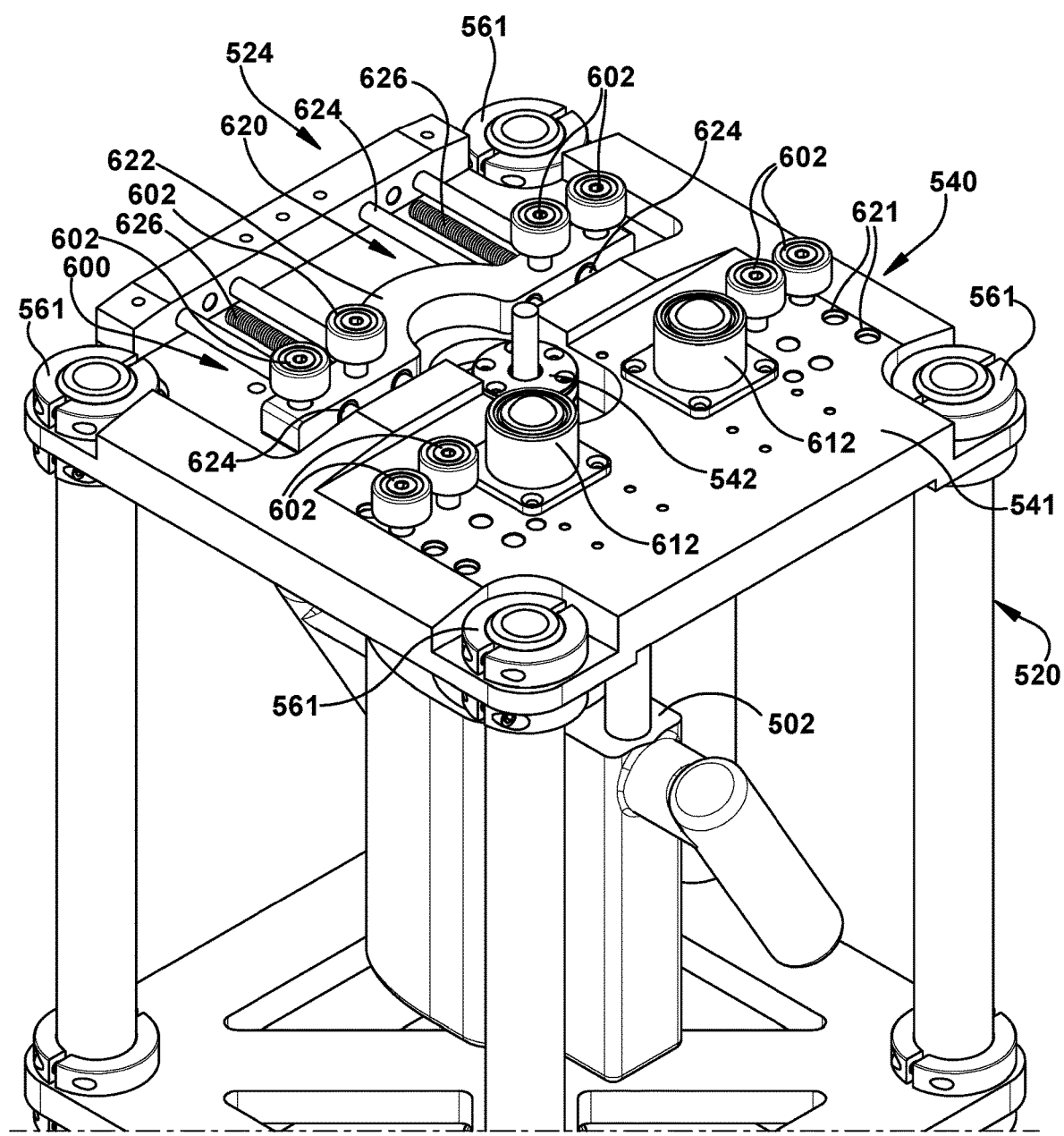
FIG. 38 shows an end perspective view of a tool mount for the mounting system of FIGS. 35-37.

FIG. 38 shows a radial end perspective view of tool mount 520 including a tool positioning mount 540 coupled to second end 524. Tool positioning mount 540 positions tool 502 relative to tool mount 520. As illustrated, tool 502 includes a machining element 542 to machine, for example, slot 182 (FIG. 18) in at least a portion of a circumferential interior surface 152 (FIG. 18) of half-shell casing 148, 150 (FIG. 18). Machining element 542 may include any now known or later developed machining element (e.g., a bit, disk, jet, EDM wire, laser for milling, drilling, grinding, cutting, etc.) capable of forming slot 182 (FIG. 18).

Referring again to FIGS. 35-37, tool mount 520 may further include a biasing system 550 for biasing second end 524 (and tool positioning mount 540 (FIG. 38)) of tool mount 520 radially outward from first end 522 towards circumferential interior surface 152 of casing 122. Biasing system 550 can take a variety of forms, as will be described herein.

In the FIGS. 35-37, embodiments, tool mount 520 may include a telescoping frame 552 (FIG. 37) including a base member 554 at first end 522 pivotally coupled to base frame 510. As will be described, telescoping frame 552 can be radially outwardly biased by biasing system 550. Base member 554 may be pivotally coupled to base frame 510 by way of pivot member 530 being coupled thereto, as described herein. Base member 554 may include a linear bearing 556. Telescoping frame 552 also includes a telescoping member 560 received by linear bearing 556 and extending to second end 524. Telescoping member 560 is fixedly coupled to tool positioning mount 540 at second end 524, e.g., by mechanical fasteners 561 (FIG. 38). In the example shown, base member 554 includes four linear bearings 556, and the telescoping member includes four telescoping members 560, each telescoping member 560 received in a respective linear bearing 556 of base member 554 and extending to second end 524. It is emphasized that telescoping frame 552 may include more or less telescoping members 554 and linear bearings 556. Further, telescoping member 552 may have alternative forms than the rods shown, e.g., they can have other cross-sectional shapes.

Telescoping member(s) 560 is/are biased radially outward from first end 522 and pivot member 530 towards circumferential interior surface 152 of half-shell casing 148, 150 by biasing system 550. In this embodiment, biasing system 550 includes a bias adjusting system 570 including a first member 572 including an opening 574 through which a telescoping member 560 slidably moves, i.e., opening 574 may simply be an opening in first member 572 or it may include a linear bearing. As shown, first member 572 is spaced from base frame 510, i.e., along telescoping member(s) 560. Bias adjusting system 570 also includes a second member 576 positioned radially outward of first member 572 and fixedly mounted to telescoping member(s) 560, e.g., by welding or mechanical fasteners 578. Biasing adjusting system 570 includes a spring 580 positioned to apply a force F between first member 572 and second member 576, forcing second end 524 of tool mount 520, tool positioning mount 540 and tool 502 radially outward towards circumferential interior surface 152. In one example, spring 580 may be provided about each telescoping member 560 between first member 572 and second member 576. It will be recognized that spring 580 may have other locations and numbers so long as force F can be applied between first member 572 and second member 576. Bias adjusting system 570 includes a position adjuster 582 operably coupled to first member 572 and second member 576 to: adjust a distance D between first member 572 and second member 576 and a radial position of tool 502 relative to circumferential interior surface 152 of half-shell casing 148, 150, and/or adjust force F applied by spring 550 to tool 502, i.e., via telescoping member(s) 560, by adjusting distance between base member 554 and first member 572. Force F may be at any level to ensure tool 502 machines circumferential interior surface 152, e.g., sufficient force to prevent chattering of tool 502. In one example, position adjuster 582 includes a (manual) jack screw 584. However, position adjuster 582 may include any now known or later developed linear adjusting system, e.g., a hydraulic or pneumatic ram, a motorized jack screw, etc.

Figure 39:
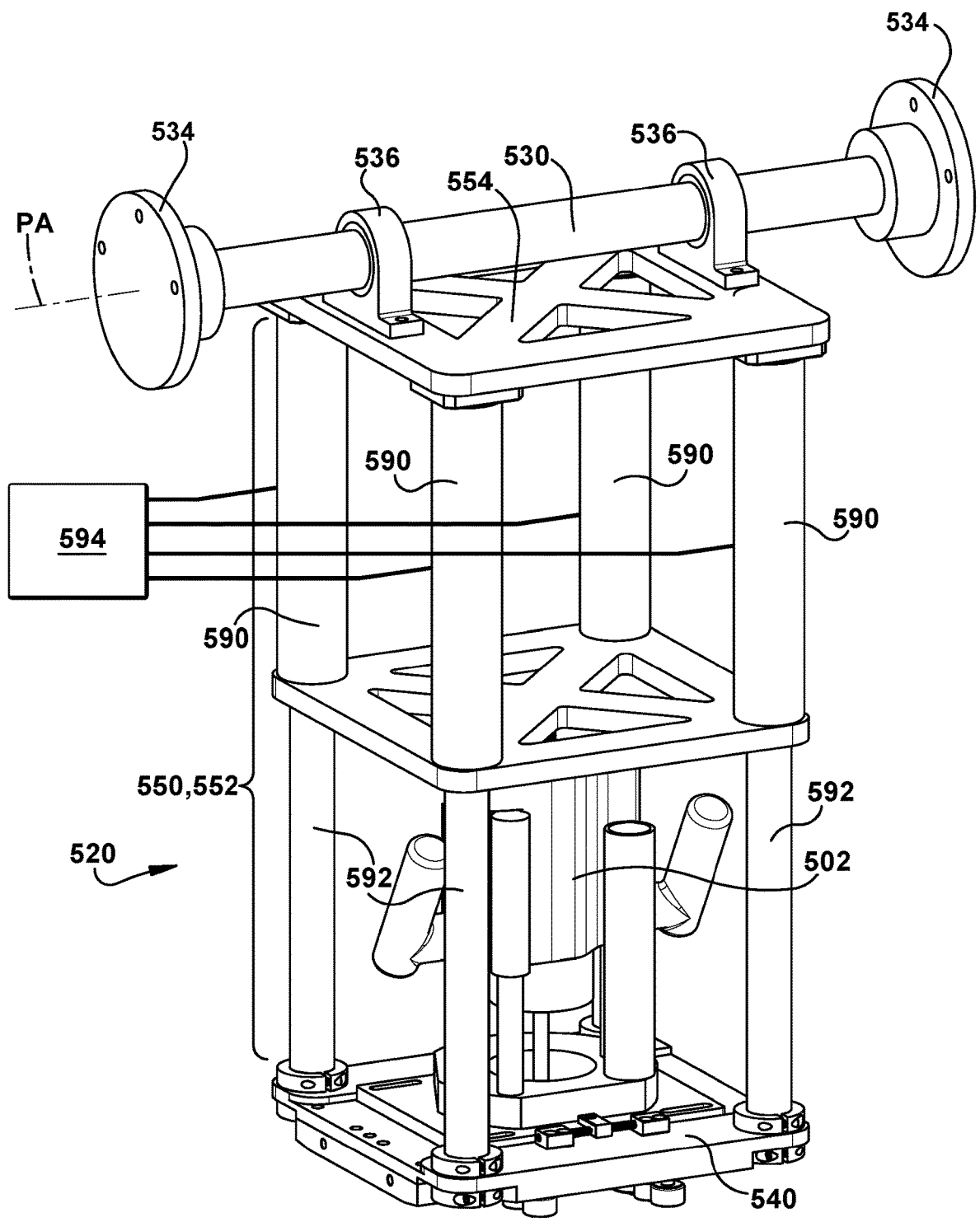
FIG. 39 shows a perspective view of a mounting system for a tool for machining a half-shell casing, according to yet another embodiment of the disclosure.

Referring to FIG. 39, an alternative embodiment of telescoping frame 552 and biasing system 550 may include one of a hydraulic ram and a pneumatic ram 590 operably positioned between base member 554 and second end 524 of tool mount 520. While four rams 590 are shown, any number may be employed. Each ram 590 may include a telescoping member 592 configured to apply force F to second end 524 of tool mount 520, and to tool 502. A power controller 594 may be provided to control each ram 590 in a known fashion.

Figure 40:
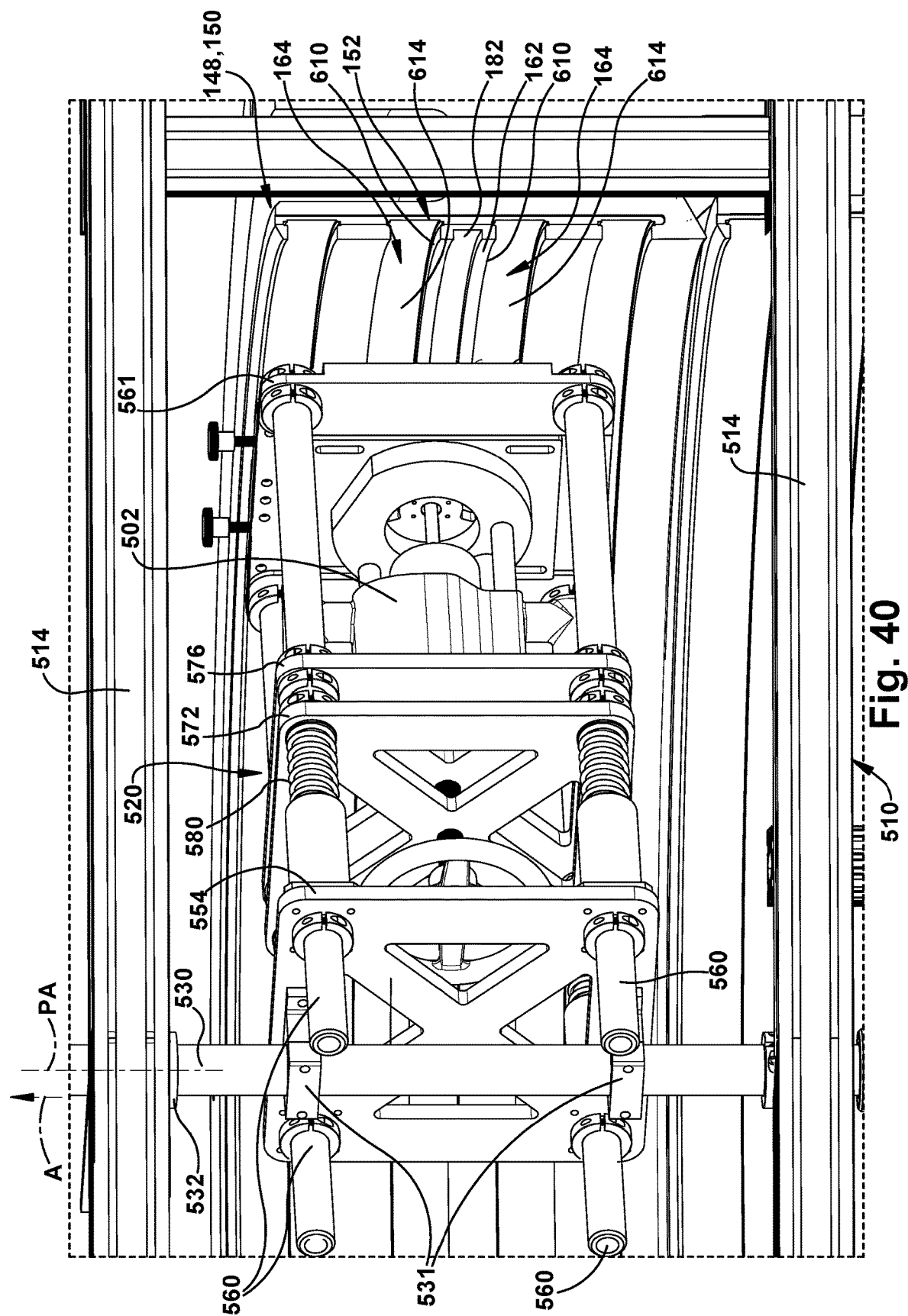
FIG. 40 shows a perspective view of a mounting system for a tool for machining a half-shell casing in operation, according to an embodiment of the disclosure.

Referring to FIGS. 38 and 40, any of the embodiments shown in FIGS. 35-39 may also include a guide system 600 coupled to tool positioning mount 540 to guide machining element 542 relative to circumferential interior surface 152 (FIGS. 35-36) of half-shell casing 148, 150 (FIGS. 35-36), e.g., to machine slot 182 (FIGS. 35-36) in circumferential interior surface 152 of the half-shell casing. FIG. 40 shows tool 502 forming an at least partially circumferentially extending slot 182 into circumferential interior surface 152. Guide system 600 may include any form of surface engaging elements to direct tool 502 in a desired manner. In example shown in FIG. 38, guide system 600 may include a plurality of roller bearings 602 coupled to tool positioning mount 540 with each roller bearing 602 positioned to engage, and position machining element 542 relative to, an axial facing surface 60 (FIG. 40) of circumferential interior surface 152 of half-shell casing 148, 150. Roller bearings 602 may include any form of roller bearing capable of withstanding the forces applied to tool positioning mount 540. Guide system 600 may also include a plurality of surface bearing elements 612 coupled to tool positioning mount 540 with each surface bearing element 612 positioned to engage and position machining element 542 relative to a radially inward facing surface 614 (FIG. 40) of circumferential interior surface 152 (FIG. 40) of half-shell casing 148, 150 (FIG. 40). Surface bearing element 612 may include any form of bearing capable of withstanding the forces applied to tool positioning mount 540. Surface bearing elements 612 may include but are not limited to a ball transfer (as shown) or an air bearing fed by compressed air. FIG. 38 also shows an adjustment system 620 configured to adjust a position of at least one of the plurality of roller bearings 602 relative to tool positioning mount 540. Adjustment system 620 can include any form of mechanism to change the position of roller bearings 602 relative to tool positioning mount 540. In the example shown, adjustment system 620 includes a sliding frame 622 upon which roller bearing(s) 602 are mounted. Sliding frame 622 is slidably positioned on rails 624, and can have its position adjusted relative to tool positioning mount 540 by an adjustable screw(s) 626. The position of roller bearings 602 could also be adjustable by, for example, providing a set number of mounting locations therefor in tool positioning mount 540. In FIG. 38, roller bearings 602 on the right side of tool positioning mount 540 are coupled into a base plate 541 of tool positioning mount 540, e.g., via threaded holes 621. This set of roller bearings 602 can be moved coarsely to other holes 621 in plate 541. On the left side of base plate 541, another set of roller bearings 602 are coupled into sliding frame 622, which can be moved toward or away from the other set of roller bearings 602 on the right side of base plate 541. These two sets of roller bearings 602 clamp to opposing axially facing surfaces 610 of a mount 164. Once clamped, the opposing roller bearings 602 guide machining element 542 of tool 502, maintaining a constant axial machining position thereof. Since mounts 164 vary in width, roller bearings 602 are mounted on sliding frame 622 to accommodate the varying sizes. Sliding frame 622 has fine adjustment, e.g., via adjustable screw(s) 626, it can also clamp down on and apply compressive force to mount 164. Roller bearings 602 maintain the axial position of tool 602 while surface bearing elements 612 maintain the radial position. At least one set of roller bearings 602 is moveable to allow for positioning of tool 502, e.g., to allow drawing of the tool into the proper cutting position.

Figure 41:
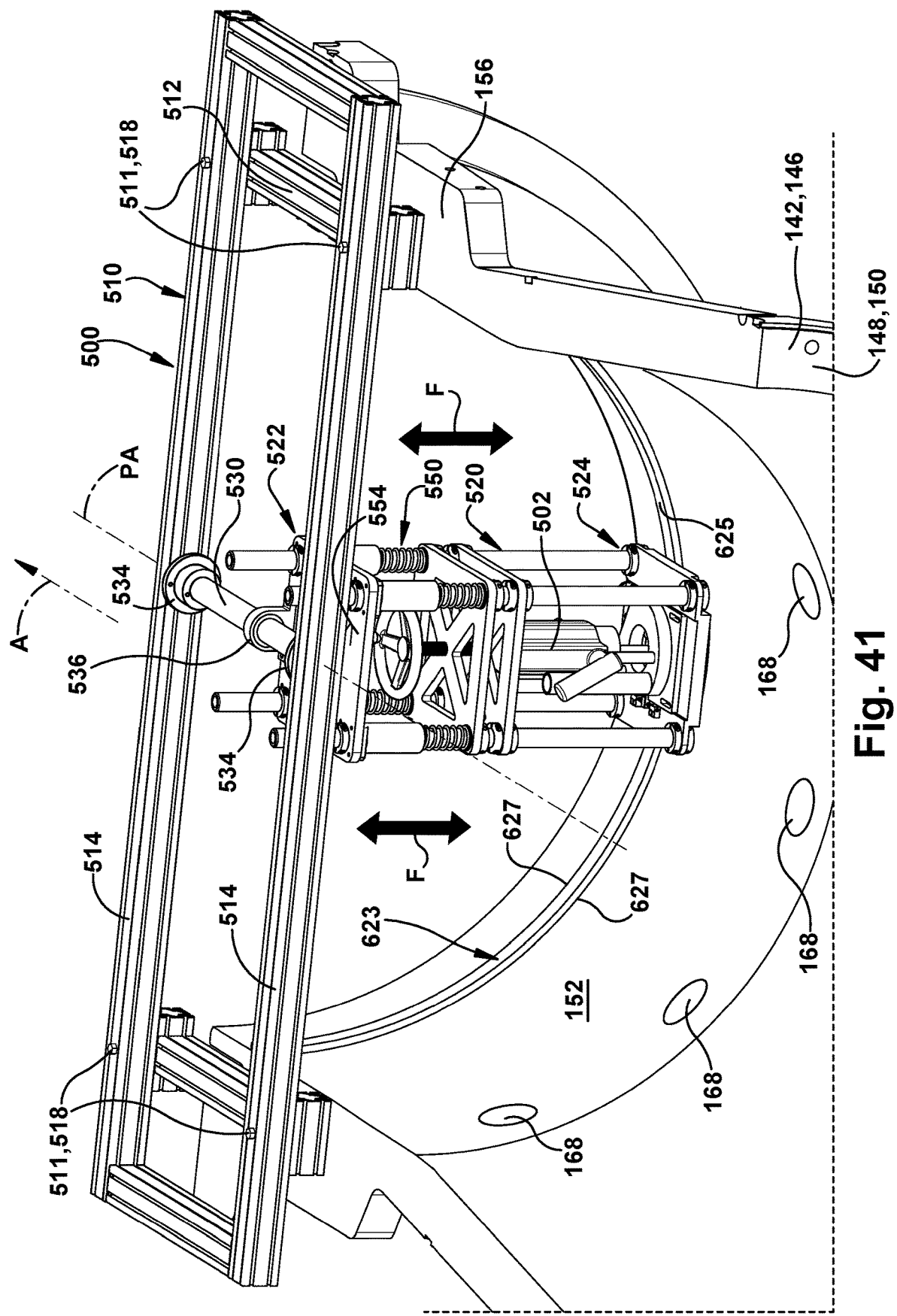
FIG. 41 shows a perspective view of a mounting system for a tool for machining a half-shell casing with no nozzle mounts therein using a jig, according to an embodiment of the disclosure.

Referring to FIG. 41, in another embodiment, half-shell casing 148, 150 may not include circumferentially extending structure, such as mounts 164, or the structure may not be where it can be used to guide tool 502. For example, for the first three stages in the lower portion of FIG. 5, variable vane, circular openings 168 are employed, so there is no circumferentially extending structure with axially facing surfaces as with mounts 164. In either case, as shown in FIG. 41, embodiments of the disclosure may provide a jig 623 coupled to circumferential interior surface 152 of half-shell casing 148, 150. Jig 623 may include a curved member 625 that extends along circumferential interior surface 152 and provides a guide surface(s) 627 for guiding tool 502. While one jig 623 is shown, any number may be employed. Jig 623 may be mounted to half-shell casing 148, 150 in a similar fashion to base frame 510, e.g., with clamps or other fasteners. Tool positioning mount 540 may couple to second end 524 of tool mount 520 and may include guide system 600, as described herein. Referring to FIGS. 38, 40 and 41, in this case, each roller bearing 602 may be positioned to engage and position machining element 542 relative to jig 623 and/or any axial facing surface 610 (FIG. 40) of circumferential interior surface 152 of half-shell casing 148, 150. Similarly, each surface bearing element 612 may be positioned to engage and position machining element 542 relative to jig 623, i.e., guide surface(s) 627, and a radially inward facing surface 614 (FIG. 40) of circumferential interior surface 152 of half-shell casing 148, 150. Guide system 600 (FIG. 38) may include adjustment system 620 (FIG. 38), as described herein.

Figure 42:
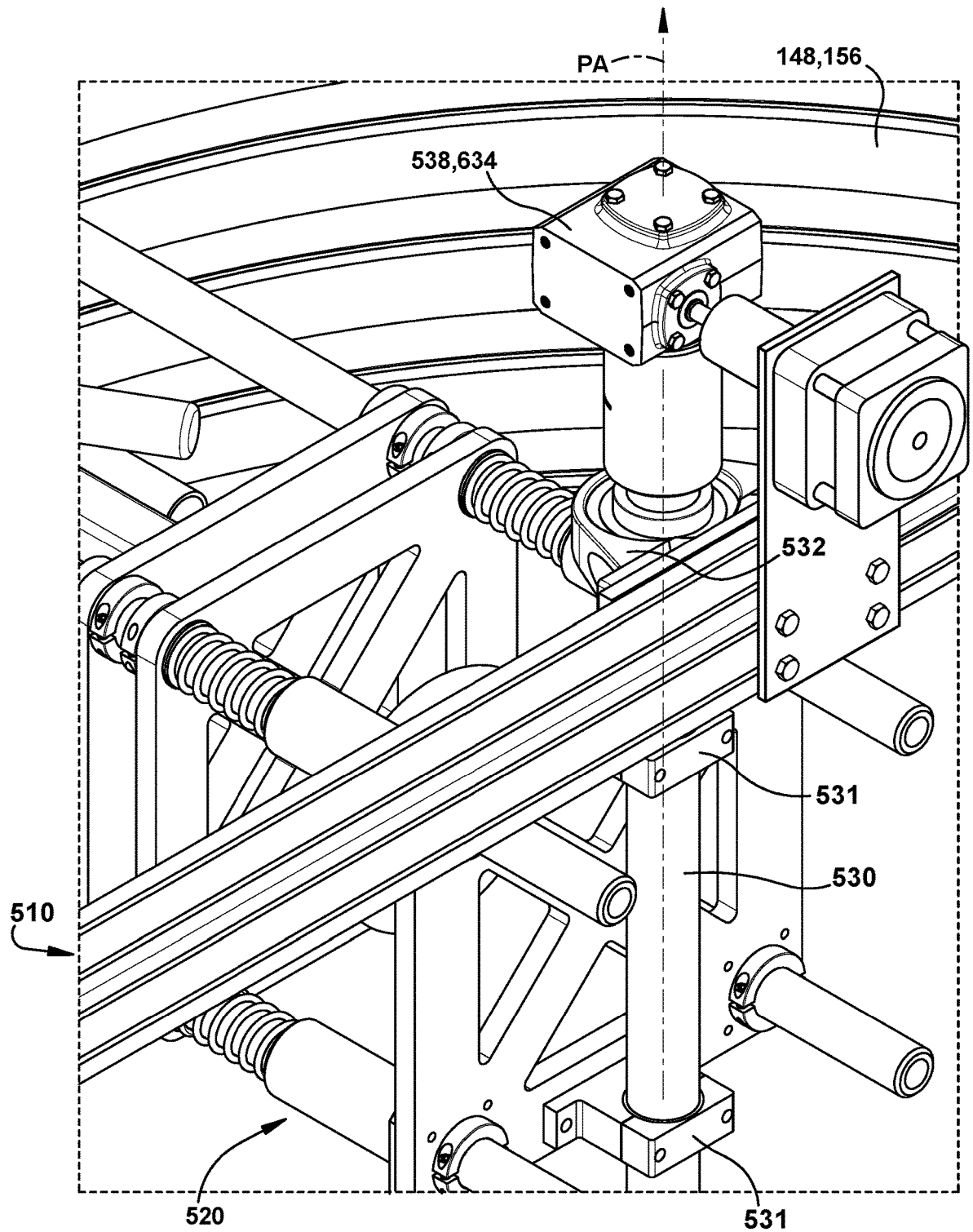
FIG. 42 shows a perspective view of a rotating actuator for use with a mounting system for a tool for machining a half-shell casing, according to another embodiment of the disclosure.

Referring to FIGS. 35 and 42, tool mount 520 may be rotated in a number of ways. As noted, in FIG. 36, tool mount 520 can be manually pushed to turn about pivot member 530. Alternatively, in FIG. 35, transmission 538 in the form of a manual gear box 630 may be operably coupled to pivot member 530 to turn pivot member 530 and tool mount 520. Manually turning a handle 632 may turn pivot member 530 and tool mount 520. In another embodiment, shown in FIG. 42, transmission 538 may include a rotating actuator 634 operably coupled to tool mount 520, i.e., pivot member 530, to rotate tool mount 520 and tool 502 about the pivot axis PA to circumferentially machine slot 182 in circumferential interior surface 152 of half-shell casing 148, 150. Rotating actuator 634 may include any form of motorized system with any necessary transmission to turn pivot member 530 at the desired rate. Rotating actuator 634 may be coupled to base frame 510 in any fashion.

Figure 43:
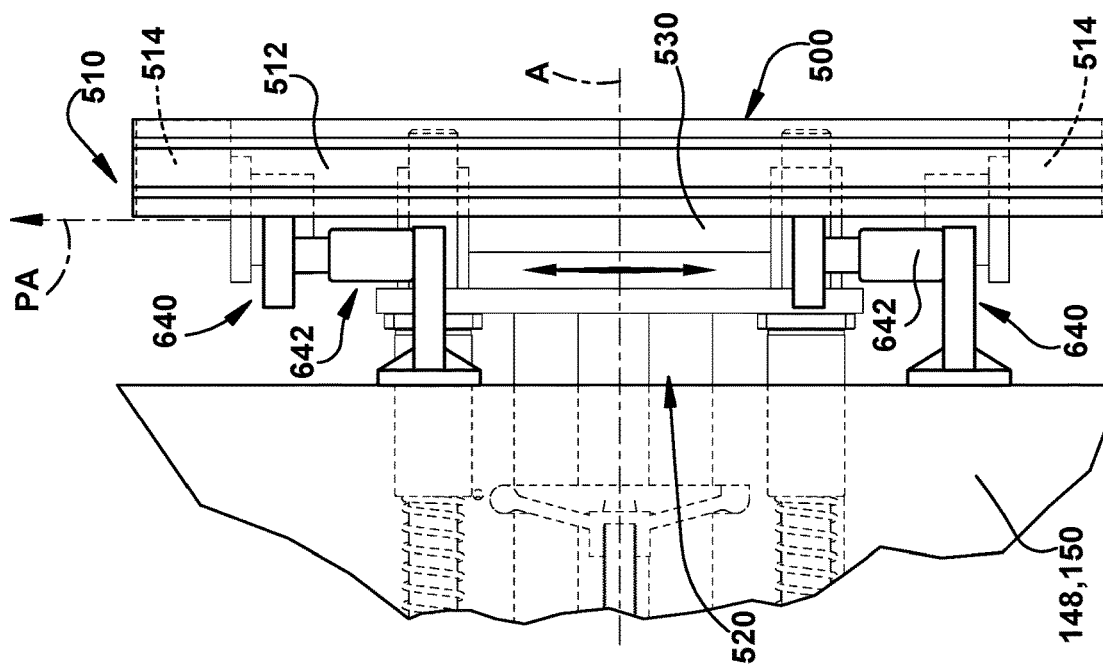
FIG. 43 shows a side view of a longitudinal adjust system for changing a position of a mounting system along an axis of a half-shell casing, according to another embodiment of the disclosure.

With reference to FIG. 43, a longitudinal adjust system 640 for changing a position of mounting system 500 along axis A of half-shell casing 148, 150 is illustrated. As noted, a longitudinal position of tool mount 520 relative to half shell casings 148, 150, i.e., position along axis A illustrated as vertical in FIG. 35 and horizontal in FIG. 36, may be based on a mounting position of base frame 510 relative to half-shell casing 148, 150. Alternatively, as shown in FIG. 43, a longitudinal adjust system 640 can be employed to automatically adjust a position of tool mount 520 relative to base frame 510. Longitudinal adjust system 640 may include any system for linearly moving one element relative to another. In one example shown in FIG. 43, longitudinal adjust system 640 may include a linear actuator 642, e.g., hydraulic or pneumatic ram, a motorized worm gear, etc., coupled at one end to half-shell casing 148, 150, e.g., with fasteners, and coupled at the other end to base frame 510, allowing linear adjustment of base frame 510 relative to half-shell casing 148, 150. Alternatively, tool 502 may be movably mounted on a carriage on rails (not shown), e.g., with bearings on shaft or sliders within guides.

In operation, after half-shell casing 148, 150 is exposed by, for example, removal from turbomachine 100 (FIG. 1) for upper half-shell casing 148, or removal of rotor 112 and remaining in place for lower half-shell casing 150, mounting system 500 is coupled to half-shell casing 148, 150. See e.g., FIGS. 35, 36, 40 and 41. Mounting system 500 can be coupled to half-shell casing 148, 150, as described herein, using mounting element 511. Once mounted, tool mount 520 is pivotally coupled to pivot relative to base frame 510 and about pivot axis PA. Tool mount 520 can be rotated such that machining element 542 is circumferentially outside of flange 156 (FIGS. 35, 36). Tool 502 can then be activated, and tool mount 520 pivoted to direct machining element 542 to machine slot 182 into at least a part of circumferential interior surface 152. Tool mount 520 can be pivoted to move tool 502 along circumferential interior surface 152. As tool mount 520 pivots, guide system 600 on tool positioning mount 540 and bearings 602 and surface bearing elements 612 thereof may guide tool 502 and machining element 542 in a desired manner to ensure proper axial and radial positioning of machining element 542. Biasing system 550 ensures tool 502 and machining element 542 maintain proper radially outward position and radially outward force F (e.g., FIGS. 36, 37). Pivot axis PA maybe aligned with axis A of turbomachine 100 (FIG. 1) and half-shell casing 148, 150. However, biasing system 550 allows for pivot axis PA to be not exactly aligned, but simply parallel, with axis A. Any number of passes of tool 502 may be completed to form slot 182. As described herein, once complete, slot 182 may receive mounting member(s) 180 for sensor(s) 170.

Figure 44:
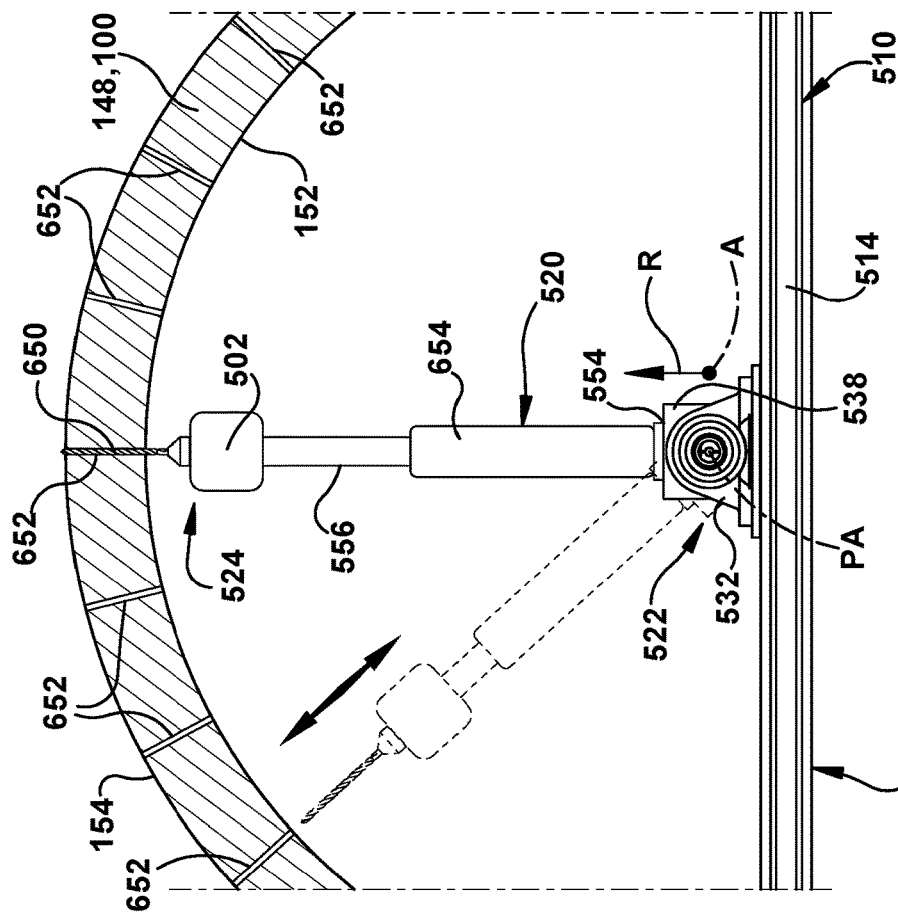
FIG. 44 shows a schematic plan view of a mounting system for drilling radially extending holes in a half-shell casing, according to an embodiment of the disclosure.

Referring to FIG. 44, in another embodiment of mounting system 500, tool 502 may include a drill machining element 650 to machine a radially extending hole 652 through half-shell casing 148, 150. Here, tool mount 520 telescopes via a linear actuator 654, to move drill machining element 650 at second end 524 of tool mount 520 radially outward and radially through half-shell casing 148, 150. In another embodiment, tool mount 520 may include telescoping frame 552, as described relative to FIGS. 35-37. In this case, a tool 502 with machining element 542 may be replaced (leaving base plate 541 connected to the end of the telescoping frame) with a tool 502 with a drill machining element 650. Alternatively, tool mount 520 may include a hydraulic or pneumatic ram 590 (shown in FIG. 44), as described relative to FIG. 37. Mounting system 500 may also include a rotating actuator, e.g., a manual or motorized transmission 538, operably coupled to tool mount 520 to rotate the tool mount and tool 502 about pivot axis PA to more than one circumferential location (2 shown in FIG. 44) relative to circumferential interior surface 152 of half-shell casing 148, 150. At each location, drill machining element 650 can be directed to drill radially extending hole 652 through half-shell casing 148, 150. Thus, mounting system 500 may also allow a radially extending hole 652 to be machined through half-shell casing 148, 150 at each of a plurality of circumferential locations. Rather than repeatedly moving a conventional drilling tool about exterior surface 154 of half-shell casing 148, 150 and addressing all of the challenges involved with doing so, mounting system 500 can be used to create any number of radially extending holes 652 in a reliable and repeatable manner, perhaps with the aid of angular-positioning measurement devices or simple analog devices such as a protractor or angle finder. Mounting system 500 may only need to be mounted once rather than numerous times, as is necessary with the conventional approach. Further, since mounting system 500 provides a controlled, circumferential rotation of tool 500, drilling radially extending holes 652 with the incorrect pitch angle can be avoided. Conventional radial sensors (not shown) can be mounted in radially extending holes 652 in any known fashion.

IV. Conclusion

Embodiments of the disclosure provide various embodiments of methods, systems and ancillary structures and tools for enabling use of sensor(s) within a circumferential interior surface of a turbomachine casing. The sensors described allow control of both axial and circumferential positions (as well as pitch angle) to improve the integrity of the measurements. Since embodiments of the disclosure provide the sensor systems on the interior of the casing, ancillary equipment on the exterior of the casing need not be removed or worked around. Obstacles like pipes, insulation, flanges, lifting lugs, other instrumentation, bolts, or any other physical object in close proximity to the casing, can be left in place. The obstacles also no longer prevent the positioning of a sensor in the optimal location, e.g., they can be asymmetric, clustered, equally spaced, etc. In addition, any number of sensors can be used, increasing the data volume that is collected. The sensors need not be removed after use, and may, depending on type, continue to be used during operation of the turbomachine. Different types of sensors can be used in different locations and/or in the same location without concern about drilling too many holes in the casing. The sensors are also not exposed from the exterior surface of the casing, reducing their susceptibility to damage. Embodiments of the disclosure also provide an improved optical sensor capable of use on the interior surface of the casing, and a wireless sensor antenna system enabling improved passive sensors.

Embodiments of the disclosure also eliminate the need for precise machining of radial holes in a factory or machine shop, allowing installation of the sensor systems (internal or radially extending) in the field. The tool described herein is highly portable, quick and easy to use and setup, and provides repeatable and accurate formation of the necessary slots. The internal sensor systems thus result in better measurement certainty, better data, and less misinterpretation of measurements. The number of holes in the casing necessary to implement the internal sensor systems are also drastically reduced compared to conventional systems, reducing the possibility of leaks. The tool can also be used to form radially extending holes for conventional radially extending sensors in a more efficient and precise manner than conventional drilling. The tool thus removes conventional concerns over whether radial mounting holes are oriented properly, and eliminates guess-work and the need to verify the radial orientation of the mounting holes.

The foregoing drawings show some of the processing associated according to several embodiments of this disclosure. It should be noted that in some alternative implementations, the acts may occur out of the order noted or, for example, may in fact be executed substantially concurrently or in the reverse order, depending upon the act involved.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A wireless sensor antenna system for a turbomachine including a rotating blade including a passive sensor, the wireless sensor antenna system comprising:
    an antenna extending continuously along a circumferential interior surface of a casing of the turbomachine that surrounds the rotating blade, the antenna configured to receive a return wireless signal from the passive sensor; and
    a power transmission element extending along the at least a portion of the circumferential interior surface of the casing to power the passive sensor by emitting an electromagnetic signal to power the passive sensor, wherein the antenna and the power transmission element extend along an entirety of the circumferential interior surface of the casing of the turbomachine that surrounds the rotating blade.

2. The wireless sensor antenna system of claim 1, wherein the antenna and the power transmission element are mounted in a mounting member positioned in an at least partially circumferentially extending slot that extends along the at least portion of the circumferential interior surface of the casing, and the mounting member includes an arcuate portion configured to mount in the at least partially circumferentially extending slot.

3. The wireless sensor antenna system of claim 1, wherein the power transmission element uses a power format selected from the group consisting of: induction, capacitance, optical and radio frequency.

4. A wireless sensor antenna system for a turbomachine including a rotating blade including a passive sensor, the wireless sensor antenna system comprising:
    an antenna extending continuously along a circumferential interior surface of a casing of the turbomachine that surrounds the rotating blade, the antenna configured to receive a return wireless signal from the passive sensor; and
    a power transmission element extending along the at least a portion of the circumferential interior surface of the casing to power the passive sensor by emitting an electromagnetic signal to power the passive sensor wherein the antenna and the power transmission element extend through an exit opening in the casing.

5. The wireless sensor antenna system of claim 4, wherein the antenna and the power transmission element extend along an entirety of the circumferential interior surface of the casing of the turbomachine that surrounds the rotating blade.

6. The wireless sensor antenna system of claim 4, wherein the antenna and the power transmission element are mounted in a mounting member positioned in an at least partially circumferentially extending slot that extends along the at least portion of the circumferential interior surface of the casing, and the mounting member includes an arcuate portion configured to mount in the at least partially circumferentially extending slot.

7. The wireless sensor antenna system of claim 4, wherein the power transmission element uses a power format selected from the group consisting of: induction, capacitance, optical and radio frequency.

8. A method of operation for a wireless sensor antenna system for a turbomachine including a rotating blade including a passive sensor, the method comprising:
    mounting an antenna extending continuously along a circumferential interior surface of a casing of the turbomachine that surrounds the rotating blade;
    mounting a power transmission element extending along at least a portion of the circumferential interior surface of the casing to power the passive sensor with an electromagnetic signal; and
    measuring a physical property of the rotating blade by powering the passive sensor with the power transmission element and receiving a wireless signal from the passive sensor on the rotating blade at the antenna, the wireless signal including data indicative of the physical property.

9. The method of claim 8, wherein the antenna and the power transmission element extend along an entirety of the circumferential interior surface of the casing of the turbomachine that surrounds the rotating blade.

10. The method of claim 8, wherein the antenna and the power transmission element extend through an exit opening in the casing.

11. The method of claim 8, wherein mounting the antenna and mounting the power transmission element include:
    positioning the antenna and the power transmission element in a mounting member including an arcuate portion; and
    mounting the mounting member in a slot that extends along the at least portion of the circumferential interior surface of the casing, wherein the arcuate portion mounts in the slot.

12. The method of claim 8, wherein the power transmission element provides power in a power format selected from the group consisting of: induction, capacitance, optical and radio frequency.

* * * * *

UNITED STATES PATENT AND TRADEMARK OFFICE
CERTIFICATE OF CORRECTION

PATENT NO. : 10,976,220 B2
APPLICATION NO. : 16/437948
DATED : April 13, 2021
INVENTOR(S) : Kurt Kramer Schleif and Mario Joseph Arceneaux It is certified that error appears in the above-identified patent and that said Letters Patent is hereby corrected as shown below:

In the Claims

At Column 31, Line 17:
"a power transmission element extending along the"
Should be:
-"a power transmission element extending along"-

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*